US012794065B2

(12) United States Patent
Nagahama et al.

(10) Patent No.: US 12,794,065 B2
(45) Date of Patent: Nov. 10, 2026

(54) BATTERY PACK

(71) Applicant: MAKITA CORPORATION, Anjo (JP)

(72) Inventors: Tatsuya Nagahama, Anjo (JP); Kazuya Tanaka, Anjo (JP)

(73) Assignee: MAKITA CORPORATION, Anjo (JP)

(*) Notice: Subject to any disclaimer, the term of this patent is extended or adjusted under 35 U.S.C. 154(b) by 814 days.

(21) Appl. No.: 18/038,593

(22) PCT Filed: Dec. 7, 2021

(86) PCT No.: PCT/JP2021/044927
§ 371 (c)(1),
(2) Date: May 24, 2023

(87) PCT Pub. No.: WO2022/124306
PCT Pub. Date: Jun. 16, 2022

(65) Prior Publication Data

US 2024/0006699 A1 Jan. 4, 2024

(30) Foreign Application Priority Data

Dec. 7, 2020 (JP) ................................ 2020-202949

(51) Int. Cl.
*H01M 50/244* (2021.01)
*H01M 50/247* (2021.01)
(Continued)

(52) U.S. Cl.
CPC ....... *H01M 50/244* (2021.01); *H01M 50/247* (2021.01); *H01M 50/284* (2021.01); *H01M 50/213* (2021.01); *H01M 50/296* (2021.01)

(58) Field of Classification Search
CPC ............. H01M 50/244; H01M 50/247; H01M 50/284; H01M 50/296; H01M 50/213
See application file for complete search history.

(56) References Cited

U.S. PATENT DOCUMENTS 10,249,918 B2 * 4/2019 Naito .................. H01M 50/247
2009/0246608 A1 * 10/2009 Wu .......................... B25F 5/02
361/747

(Continued)

FOREIGN PATENT DOCUMENTS

CN 209929371 U 1/2020
CN 211654886 U 10/2020

(Continued)

OTHER PUBLICATIONS

CN 209929371 MT (Year: 2020).*

(Continued)

*Primary Examiner* — Alexander Usyatinsky
(74) *Attorney, Agent, or Firm* — Oliff PLC

(57) ABSTRACT

A battery pack includes a casing, a battery cell, a circuit board, an engaging member, a first biasing member biasing the engaging member upward, and a second biasing member biasing the engaging member upward. A part of the circuit board is arranged between the first biasing member and the second biasing member. The engaging member includes an engaging portion protruding to the outside of the casing. The engaging portion has an engaging surface that extends along an up-down direction and a left-right direction and engages with an electrical device. In a front-rear direction, the engaging surface is arranged rearward of a front end of the first biasing member and frontward of a rear end of the first biasing member. In the front-rear direction, the engaging surface is arranged rearward of a front end of the second biasing member and frontward of a rear end of the second biasing member.

18 Claims, 31 Drawing Sheets

(51) Int. Cl.

| | |
|---|---|
| ***H01M 50/284*** | (2021.01) |
| *H01M 50/213* | (2021.01) |
| *H01M 50/296* | (2021.01) |

(56) References Cited

U.S. PATENT DOCUMENTS

| | | | | |
|---|---|---|---|---|
| 2012/0256590 | A1* | 10/2012 | Hamano ................ | H02J 7/751<br>320/112 |
| 2014/0272516 | A1 | 9/2014 | Tennison et al. | |

FOREIGN PATENT DOCUMENTS

| | | | |
|---|---|---|---|
| JP | 2005-174758 | A | 6/2005 |
| JP | 2012-221780 | A | 11/2012 |
| JP | 2013-191289 | A | 9/2013 |

OTHER PUBLICATIONS

JPO decision to grant a Patent for JP2022568293 (Year: 2025).*
JPO Decision to grant a Patent (Year: 2025).*
Sep. 9, 2025 Office Action issued in Japanese Patent Application No. 2022-568293.
Feb. 8, 2022 International Search Report issued in International Patent Application No. PCT/JP2021/044927.
Feb. 8, 2022 Written Opinion of the International Searching Authority issued in International Patent Application No. PCT/JP2021/044927.
Jan. 29, 2025 extended Search Report issued in European Patent Application No. 21903405.5.

* cited by examiner

BATTERY PACK

TECHNICAL FIELD

Techniques disclosed in the present specification relate to battery packs.

BACKGROUND ART

A battery pack is disclosed in Patent Document 1. The battery pack is detachably attached to a battery pack-mount part of an electrical device by being slid with respect thereto. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in the state where the battery pack is attached to the battery pack-mount part, and a down direction is defined as the direction opposite to the up direction. The battery pack includes a casing, a battery cell housed inside the casing, a circuit board housed inside the casing, an engaging member held by the casing so as to be movable in an up-down direction, and a biasing member configured to bias the engaging member upward. The engaging member includes an engaging portion protruding to outside of the casing. The engaging portion has an engaging surface that extends in the up-down direction and a left-right direction and is configured to engage with the electrical device.

CITATION LIST

Patent Document

Patent Document 1: US Patent Application Publication No. 2014/0272516

SUMMARY OF INVENTION

Technical Problem

When a battery pack such as the one described above is used in dusty environments, dust may enter a gap between the engaging member and the casing. If the engaging member tilts with respect to the casing while moving in the up-down direction with respect to the casing, the engaging member may be caught on the casing and thus may not smoothly move with respect to the casing. In the present specification, techniques are provided that allow an engaging member to smoothly move with respect to a casing even when a battery pack is used in dusty environments.

Solution to Technical Problem

A battery pack disclosed in the present specification may be configured to be detachably attached to a battery pack-mount part of an electrical device by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction. The battery pack may comprise a casing, a battery cell housed inside the casing, a circuit board housed inside the casing, an engaging member held by the casing so as to be movable in an up-down direction, a first biasing member configured to bias the engaging member upward, and a second biasing member spaced apart from the first biasing member in a left-right direction and configured to bias the engaging member upward. At least a part of the circuit board may be arranged between the first biasing member and the second biasing member. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member.

According to the configuration above, the first biasing member and the second biasing member, which are spaced apart from each other in the left-right direction, bias the engaging member upward, and thus a biasing force applied to the engaging member can be balanced in the left-right direction and the engaging member is suppressed from tilting with respect to the casing in the left-right direction. Further, according to the configuration above, a position in the front-rear direction of the point of application of the biasing force applied to the engaging member can be set close to a position of the engaging portion in the front-rear direction. Thus, even when dust enters a gap between the engaging member and the casing and the engaging portion is caught on the casing, the biasing force of the first biasing member and the second biasing member can be applied to the engaging member to release the engaging portion from being caught. Further, according to the configuration above, at least a part of the circuit board is arranged between the first biasing member and the second biasing member, and thus a space between the first biasing member and the second biasing member can be efficiently utilized.

Another battery pack disclosed in the present specification may be configured to be detachably attached to a battery pack-mount part of an electrical device by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction. The battery pack may comprise a casing, a battery cell housed inside the casing, an engaging member held by the casing so as to be movable in an up-down direction, a first biasing member configured to bias the engaging member upward, and a second biasing member spaced apart from the first biasing member in a left-right direction and configured to bias the engaging member upward. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member. In the left-right direction, a right end of the first biasing member may be arranged rightward of a right end of the engaging surface. In the left-right direction, a left end of the second biasing member may be arranged leftward of a left end of the engaging surface.

According to the configuration above, the first biasing member and the second biasing member, which are spaced apart from each other in the left-right direction, bias the engaging member upward, and thus a biasing force applied to the engaging member can be balanced in the left-right direction and the engaging member is suppressed from tilting with respect to the casing in the left-right direction. Further, according to the configuration above, a position in the front-rear direction of the point of application of the biasing force applied to the engaging member can be set close to a position of the engaging portion in the front-rear direction. Thus, even when dust enters a gap between the engaging member and the casing and the engaging portion is caught on the casing, the biasing force of the first biasing member and the second biasing member can be applied to the engaging member to release the engaging portion from being caught. Further, according to the configuration above, a wide interval is ensured between the first biasing member and the second biasing member, and thus the biasing force applied to the engaging member can be easily balanced in the left-right direction and the engaging member can be efficiently suppressed from tilting with respect to the casing in the left-right direction.

Still another battery pack disclosed in the present specification may be configured to be detachably attached to a battery pack-mount part of an electrical device including a device-side terminal by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in state where the battery pack is attached to the battery pack-mount part, and a down direction is defined as a direction opposite to the up direction. The battery pack may comprise a casing, a battery cell housed inside the casing, a battery-side terminal configured to mechanically engage with and electrically connect to the device-side terminal, an engaging member held by the casing so as to be movable in an up-down direction, a first biasing member configured to bias the engaging member upward, and a second biasing member spaced apart from the first biasing member in a left-right direction and configured to bias the engaging member upward. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member. In the left-right direction, a right end of the first biasing member may be arranged rightward of a right end of the battery-side terminal. In the left-right direction, a left end of the second biasing member may be arranged leftward of a left end of the battery-side terminal.

According to the configuration above, the first biasing member and the second biasing member, which are spaced apart from each other in the left-right direction, bias the engaging member upward, and thus a biasing force applied to the engaging member can be balanced in the left-right direction and the engaging member is suppressed from tilting with respect to the casing in the left-right direction. Further, according to the configuration above, a position in the front-rear direction of the point of application of the biasing force applied to the engaging member can be set close to a position of the engaging portion in the front-rear direction. Thus, even when dust enters a gap between the engaging member and the casing and the engaging portion is caught on the casing, the biasing force of the first biasing member and the second biasing member can be applied to the engaging member to release the engaging portion from being caught. Further, according to the configuration above, a wide interval is ensured between the first biasing member and the second biasing member, and thus the biasing force applied to the engaging member can be easily balanced in the left-right direction and the engaging member can be efficiently suppressed from tilting with respect to the casing in the left-right direction.

Yet another battery pack disclosed in the present specification may be configured to be detachably attached to a battery pack-mount part of an electrical device by being slid with respect to the battery pack-mount part. The battery pack may comprise a casing, an engaging member including an engaging portion protruding to outside of the casing, and a manipulatable member having a manipulatable surface exposed to outside of the casing. The engaging portion may be configured to move toward inside of the casing when the manipulatable surface is pressed. An anti-slip portion that is formed of regularly arranged convex shapes and/or concave shapes may be formed on the manipulatable surface. The anti-slip portion may be arranged, on the manipulatable surface, on a side closer to the engaging portion. It should be noted that the engaging member and the manipulatable member herein may be an integrated member or separate members.

According to the configuration above, when a user detaches the battery pack from the battery pack-mount part, the user can be prompted to place his/her fingertip on the anti-slip portion, which is arranged on the side closer to the engaging portion on the manipulatable surface, to press the manipulatable surface. This allows a pressing force generated by the manipulatable surface being pressed by the user to be applied to a position close to the engaging portion, and thus the engaging member can be smoothly moved with respect to the casing.

DESCRIPTION OF EMBODIMENTS

Figure 1:
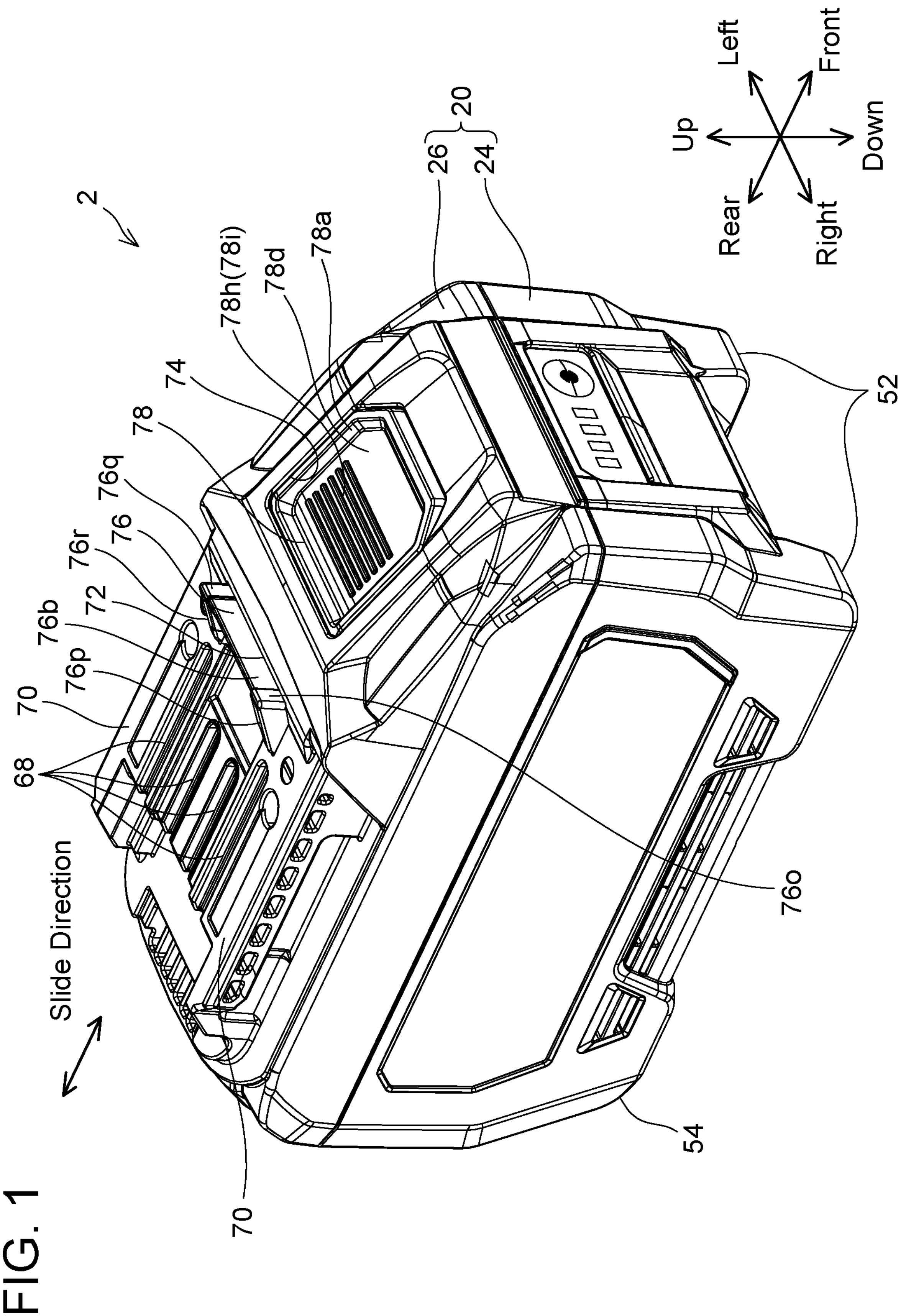
FIG. 1 is a perspective view of a battery pack 2 according to a first embodiment, as viewed from the upper front right side.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved battery packs.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a battery pack may be configured to be detachably attached to a battery pack-mount part of an electrical device by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction. The battery pack may comprise a casing, a battery cell housed inside the casing, a circuit board housed inside the casing, an engaging member held by the casing so as to be movable in an up-down direction, a first biasing member configured to bias the engaging member upward, and a second biasing member spaced apart from the first biasing member in a left-right direction and configured to bias the engaging member upward. At least a part of the circuit board may be arranged between the first biasing member and the second biasing member. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member.

In one or more embodiments, in the left-right direction, a right end of the first biasing member may be arranged rightward of a right end of the engaging surface. In the left-right direction, a left end of the second biasing member may be arranged leftward of a left end of the engaging surface.

According to the configuration above, a wide interval is ensured between the first biasing member and the second biasing member, and thus a wide space for mounting elements and wires on the circuit board can be ensured. Further, since the wide interval is ensured between the first biasing member and the second biasing member, a biasing force applied to the engaging member can be easily balanced in the left-right direction and the engaging member can be efficiently suppressed from tilting with respect to the casing in the left-right direction.

In one or more embodiments, in the left-right direction, a left end of the first biasing member may be arranged rightward of the right end of the engaging surface. In the left-right direction, a right end of the second biasing member may be arranged leftward of the left end of the engaging surface.

According to the configuration above, a wide interval is ensured between the first biasing member and the second biasing member, and thus a wide space for mounting elements and wires on the circuit board can be ensured. Further, since the wide interval is ensured between the first biasing member and the second biasing member, a biasing force applied to the engaging member can be easily balanced in the left-right direction and the engaging member can be efficiently suppressed from tilting with respect to the casing in the left-right direction.

In one or more embodiments, the battery pack-mount part may include a device-side terminal. The circuit board may include a battery-side terminal configured to mechanically engage with and electrically connect to the device-side terminal. In the left-right direction, a right end of the first biasing member may be arranged rightward of a right end of the battery-side terminal. In the left-right direction, a left end of the second biasing member may be arranged leftward of a left end of the battery-side terminal.

According to the configuration above, a wide interval is ensured between the first biasing member and the second biasing member, and thus a wide space for mounting elements and wires on the circuit board can be ensured. Further, since the wide interval is ensured between the first biasing member and the second biasing member, a biasing force applied to the engaging member can be easily balanced in the left-right direction and the engaging member can be efficiently suppressed from tilting with respect to the casing in the left-right direction.

In one or more embodiments, in the left-right direction, a left end of the first biasing member may be arranged rightward of the right end of the battery-side terminal. In the left-right direction, a right end of the second biasing member may be arranged leftward of the left end of the battery-side terminal.

According to the configuration above, a wide interval is ensured between the first biasing member and the second biasing member, and thus a wide space for mounting elements and wires on the circuit board can be ensured. Further, since the wide interval is ensured between the first biasing member and the second biasing member, a biasing force applied to the engaging member can be easily balanced in the left-right direction and the engaging member can be efficiently suppressed from tilting with respect to the casing in the left-right direction.

In one or more embodiments, the circuit board may include a power path along which a current discharged to and/or charged from the electrical device flows. The power path may pass between the first biasing member and the second biasing member.

According to the configuration above, the power path is positioned at a portion of the circuit board that is arranged between the first biasing member and the second biasing member, and thus the other portions of the circuit board can be efficiently utilized as spaces for mounting other elements and wires.

In one or more embodiments, the circuit board may include a microcontroller configured to control an operation of the battery pack. The microcontroller may be arranged between the first biasing member and the second biasing member.

According to the configuration above, the microcontroller is arranged between the first biasing member and the second biasing member, and thus the other portions of the circuit board can be efficiently utilized as spaces for mounting other elements and wires.

In one or more embodiments, the battery pack may further comprise a manipulatable member pivotably held by the casing and having a manipulatable surface configured to be manipulated by a user. When the user presses the manipulatable surface, the manipulatable member may pivot in a direction that causes the engaging member to be pushed downward.

According to the configuration above, the engaging member is less likely to tilt with respect to the casing when moving in the up-down direction with respect to the casing, as compared to a configuration in which the engaging member is integrated with the manipulatable member, and thus the engaging member is less likely to be caught on the casing.

In one or more embodiments, the manipulatable surface may be arranged on a front upper surface of the casing.

According to the configuration above, when the user detaches the battery pack from the battery pack-mount part, the user can place his/her four fingers of one hand, other than the thumb, on a lower surface of the battery pack and push down the manipulatable surface with the thumb to slide the battery pack forward while keeping the manipulatable surface pushed down and holding the battery pack. This simplifies the user's manipulation of detaching the battery pack.

In one or more embodiments, the manipulatable member may be held by the casing so as to be pivotable about a pivot axis extending in the left-right direction.

According to the configuration above, the manipulatable surface can be suppressed from tilting in the left-right direction when the user pushes down the manipulatable surface.

In one or more embodiments, the engaging member may include a portion to be abutted. The manipulatable member may include an abutment portion arranged above the portion to be abutted. In the front-rear direction, a position where the abutment portion abuts the portion to be abutted may be rearward of the front end of the first biasing member and forward of the rear end of the first biasing member. In the front-rear direction, the position where the abutment portion abuts the portion to be abutted may be rearward of the front end of the second biasing member and forward of the rear end of the second biasing member.

According to the configuration above, a position in the front-rear direction of the point of application of a downward force applied from the manipulatable member to the engaging member can be set close to a position in the front-rear direction of the point of application of an upward force applied from the first and second biasing members to the engaging member. This can suppress the engaging member from tilting in the front-rear direction.

In one or more embodiments, the portion to be abutted may include a rod-shaped portion extending in the left-right direction. The abutment portion may include an abutment piece arranged above the rod-shaped portion.

According to the configuration above, the configurations of the manipulatable member and the engaging member can be simplified.

In one or more embodiments, the casing may further include a guide portion configured to prohibit movement of the engaging member in the front-rear direction and to permit movement of the engaging member in the up-down direction. In the front-rear direction, the first biasing member may be arranged rearward of a front end of the guide portion and forward of a rear end of the guide portion. In the front-rear direction, the second biasing member may be arranged rearward of the front end of the guide portion and forward of the rear end of the guide portion.

According to the configuration above, a position in the front-rear direction of the point of application of a biasing force applied from the first and second biasing members to the engaging member can be set close to a position of the guide portion in the front-rear direction. This can suppress the engaging member from tilting in the front-rear direction.

In one or more embodiments, a battery pack may be configured to be detachably attached to a battery pack-mount part of an electrical device by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction. The battery pack may comprise a casing, a battery cell housed inside the casing, an engaging member held by the casing so as to be movable in an up-down direction, a first biasing member configured to bias the engaging member upward, and a second biasing member spaced apart from the first biasing member in a left-right direction and configured to bias the engaging member upward. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member. In the left-right direction, a right end of the first biasing member may be arranged rightward of a right end of the engaging surface. In the left-right direction, a left end of the second biasing member may be arranged leftward of a left end of the engaging surface.

In one or more embodiments, a battery pack may be configured to be detachably attached to a battery pack-mount part of an electrical device including a device-side terminal by being slid with respect to the battery pack-mount part. A front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction. The battery pack may comprise a casing, a battery cell housed inside the casing, a battery-side terminal configured to mechanically engage with and electrically connect to the device-side terminal, an engaging member held by the casing so as to be movable in an up-down direction, a first biasing member configured to bias the engaging member upward, and a second biasing member spaced apart from the first biasing member in a left-right direction and configured to bias the engaging member upward. The engaging member may include an engaging portion protruding to outside of the casing. The engaging portion may have an engaging surface that extends in the up-down direction and the left-right direction and is configured to engage with the electrical device. In a front-rear direction, the engaging surface may be arranged rearward of a front end of the first biasing member and forward of a rear end of the first biasing member. In the front-rear direction, the engaging surface may be arranged rearward of a front end of the second biasing member and forward of a rear end of the second biasing member. In the left-right direction, a right end of the first biasing member may be arranged rightward of a right end of the battery-side terminal. In the left-right direction, a left end of the second biasing member may be arranged leftward of a left end of the battery-side terminal.

In one or more embodiments, a battery pack may be configured to be detachably attached to a battery pack-mount part of an electrical device by being slid with respect to the battery pack-mount part. The battery pack may comprise a casing, an engaging member including an engaging portion protruding to outside of the casing, and a manipulatable member having a manipulatable surface exposed to outside of the casing. The engaging portion may be configured to move toward inside of the casing when the manipulatable surface is pressed. An anti-slip portion that is formed of regularly arranged convex shapes and/or concave shapes may be formed on the manipulatable surface. The anti-slip portion may be arranged, on the manipulatable surface, on a side closer to the engaging portion.

In one or more embodiments, the anti-slip portion may be formed of a plurality of convex lines and/or concave lines extending in a direction substantially orthogonal to a direction in which the battery pack is slid when the battery pack is detached from the battery pack-mount part.

According to the configuration above, when the user presses the manipulatable surface with his/her fingertip placed on the anti-slip portion to detach the battery pack from the battery pack-mount part, the fingertip is efficiently suppressed from slipping from the anti-slip portion.

First Embodiment

Figure 2:
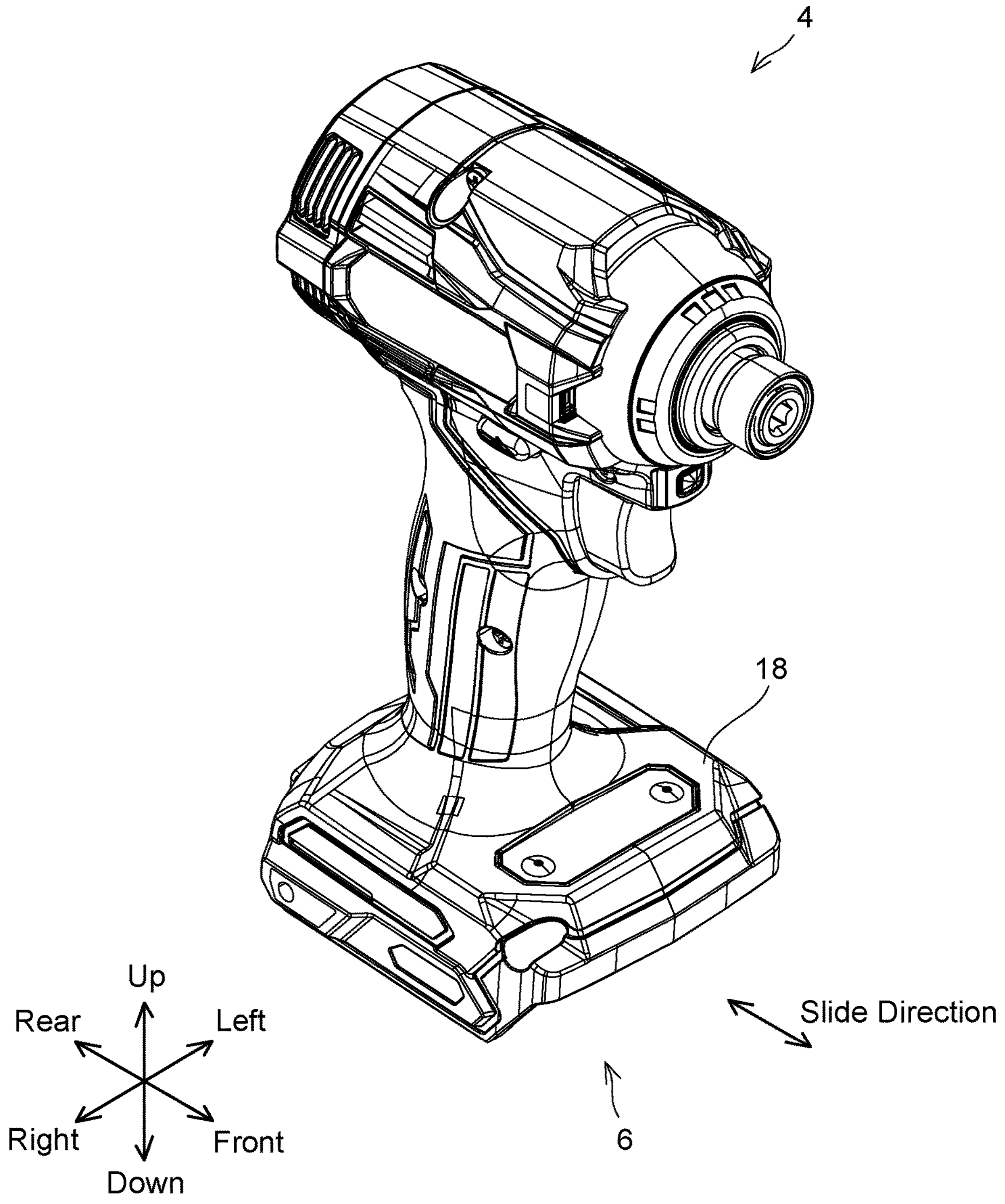
FIG. 2 is a perspective view of an electrical device 4 to which the battery pack 2 according to the first embodiment is attached, as viewed from the upper front right side.

A battery pack 2 according to the present embodiment, which is illustrated in FIG. 1, is attached to an electrical device 4 illustrated in FIG. 2 for use. The electrical device 4 operates with electric power supplied from the battery pack 2. The electrical device 4 may be, for example, a power tool powered by a motor, such as a driver, a drill, or the like, or an electrical working machine powered by a motor such as a grass trimmer, blower, or the like. Alternatively, the electrical device 4 may be an electrical device that is not equipped with a motor, such as a light, a radio, a speaker, or the like. Alternatively, the electrical device 4 may be a charger that supplies electric power to the battery pack 2. The rated voltage of the battery pack 2 is, for example, 36 V. The rated capacity of the battery pack 2 is, for example, 5.0 Ah. The weight of the battery pack 2 is, for example, in a range from 1.0 kg to 2.0 kg. More specifically, the weight of the battery pack 2 is, for example, 1.33 kg or 1.9 kg.

As illustrated in FIG. 2, the electrical device 4 comprises a battery pack-mount part 6. The battery pack 2 is attachable to the battery pack-mount part 6 by being slid in a predetermined slide direction with respect to the battery pack-mount part 6. Hereinafter, a direction in which the battery pack 2 is slid when the battery pack 2 is attached to the battery pack-mount part 6 will be termed a rear direction, and a direction in which the battery pack 2 is slid when the battery pack 2 is detached from the battery pack-mount part 6 will be termed a front direction. Further, a direction in which the battery pack-mount part 6 is positioned as viewed from the battery pack 2 in the state where the battery pack 2 is attached to the battery pack-mount part 6 will be termed an up direction, and the direction opposite to the up direction will be termed a down direction. Further, a direction orthogonal to the front-rear direction and the up-down direction will be termed a left-right direction.

Figure 3:
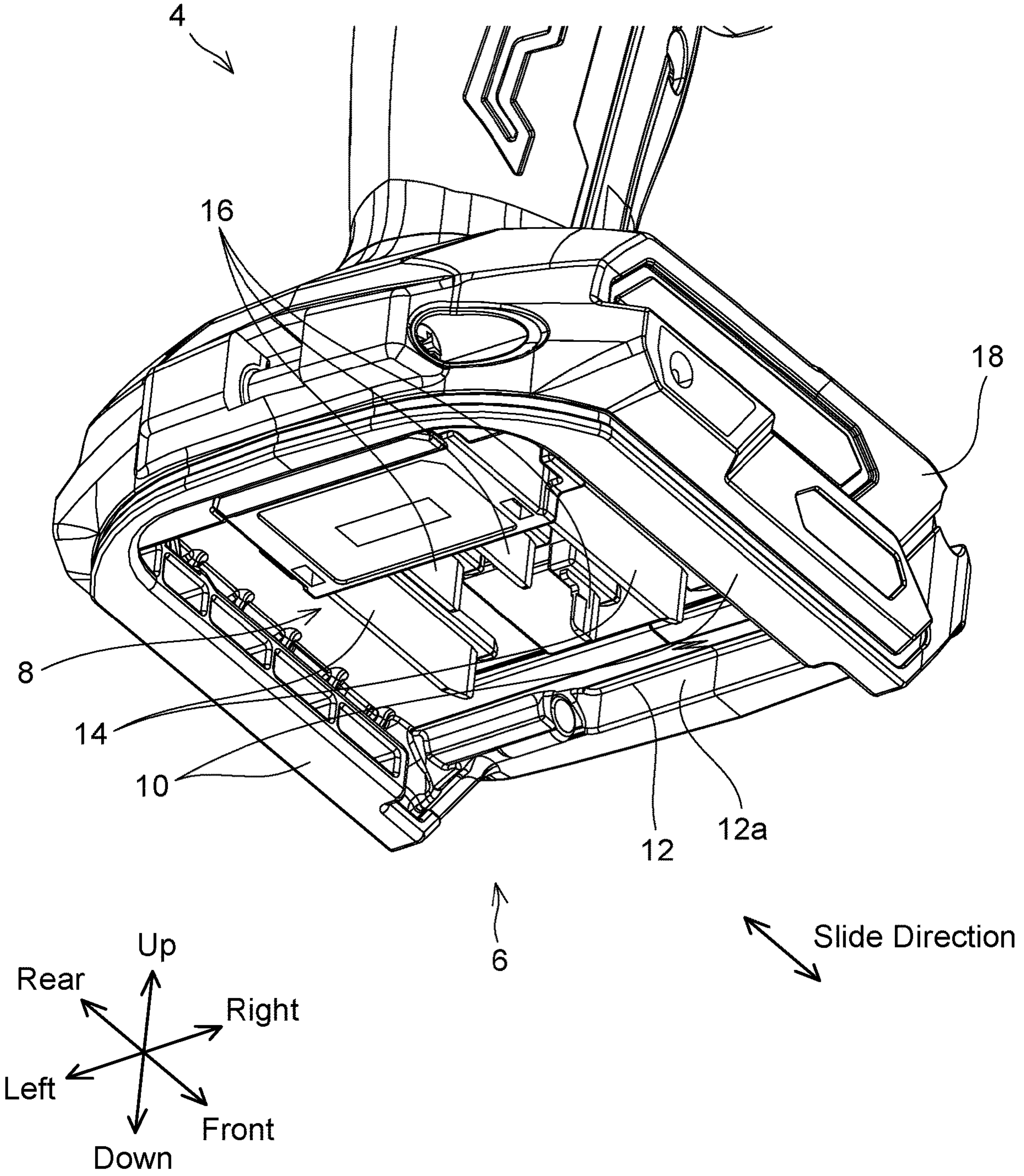
FIG. 3 is a perspective view of the electrical device 4 to which the battery pack 2 according to the first embodiment is attached, in the vicinity of a battery pack-mount part 6, as viewed from the lower rear right side.

As illustrated in FIG. 3, the battery pack-mount part 6 of the electrical device 4 is equipped with a device-side terminal 8, device-side rails 10, and an engaging groove 12. The device-side terminal 8 comprises two power terminals 14 for electric power transmission with the battery pack 2 and three signal terminals 16 for signal communication with the battery pack 2. It should be noted that the number of the signal terminals 16 is not limited to three, and the electrical device 4 may comprise one or two signal terminals 16 or four signal terminals 16. The power terminals 14 are arranged leftward and rightward of the signal terminals 16. The device-side rails 10 and the engaging groove 12 are formed at a lower end of a housing 18 of the electrical device 4. The device-side rails 10 extend in the front-rear direction and are arranged on left and right sides of the device-side terminal 8. The engaging groove 12 is arranged forward of the device-side terminal 8 and is recessed upward. The engaging groove 12 is provided with an engaging surface 12*a* that is arranged along the up-down direction and the left-right direction and faces rearward.

As illustrated in FIG. 1, the battery pack 2 comprises a casing 20 and a battery cell unit 22 (see FIG. 4) housed inside the casing 20. The casing 20 comprises a lower casing 24 and an upper casing 26.

Figure 4:
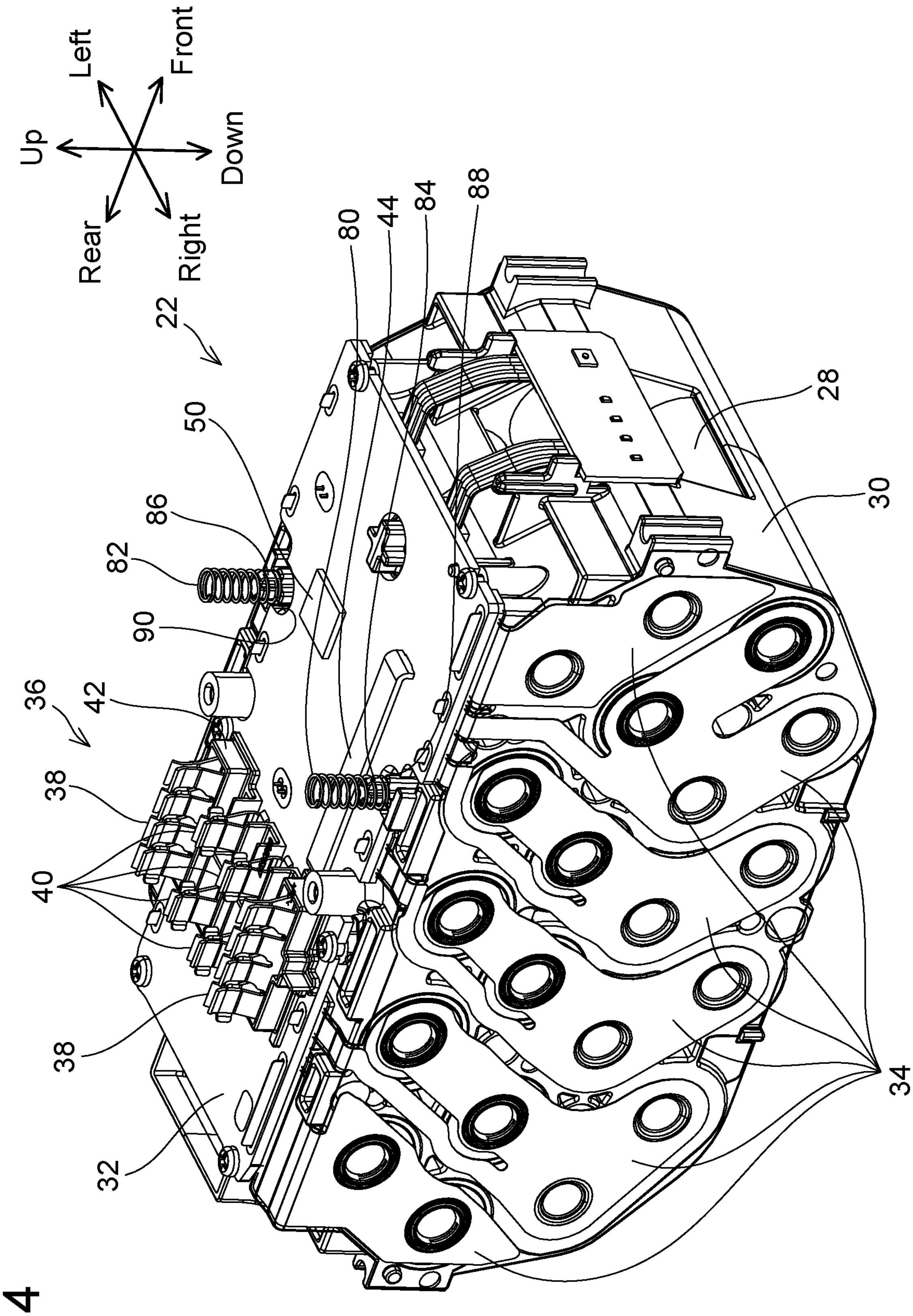
FIG. 4 is a perspective view of a battery cell unit 22 of the battery pack 2 according to the first embodiment, as viewed from the upper front right side.

As illustrated in FIG. 4, the battery cell unit 22 comprises battery cells 28, a cell holder 30 made of resin and holding the battery cells 28, a control circuit board 32 held by the cell holder 30 above the cell holder 30, lead plates 34 arranged on left and right surfaces of the cell holder 30 and electrically connecting the battery cells 28 to the control circuit board 32, and a battery-side terminal 36 arranged on an upper surface of the control circuit board 32. The battery-side terminal 36 comprises two power terminals 38 arranged corresponding to the power terminals 14 of the electrical device 4 and four signal terminals 40 arranged corresponding to the signal terminals 16 of the electrical device 4.

Figure 5:
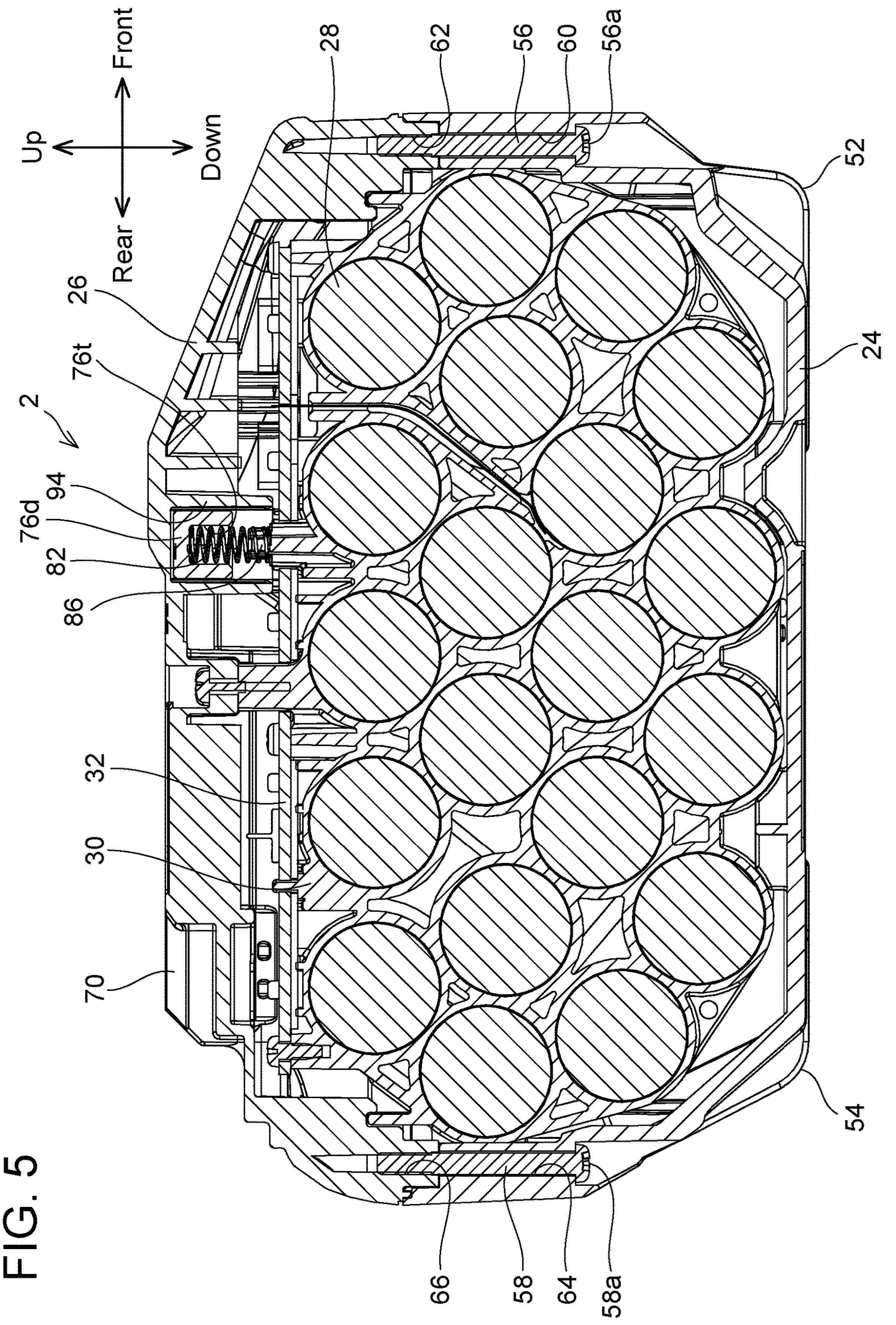
FIG. 5 is a longitudinal cross-sectional view of the battery cell unit 22 of the battery pack 2 according to the first embodiment.

As illustrated in FIG. 5, the battery cells 28 are arranged in four layers in the up-down direction. Each battery cell 28 is, for example, a lithium-ion battery cell. Each battery cell 28 is substantially cylindrical and is arranged such that its longitudinal direction is along the left-right direction. The shape of each battery cell 28 is according to, for example, standard 18650, having a diameter of 18 mm and a longitudinal dimension of 65 mm. In the first layer from the bottom, four battery cells 28 are arranged in the front-rear direction. Among the battery cells 28 in the first layer from the bottom, the first battery cell 28 from the front and the first battery cell 28 from the rear are arranged slightly higher than the other battery cells 28. In the second layer from the bottom, five battery cells 28 are arranged in the front-rear direction. In the front-rear direction, positions of the centers of the battery cells 28 in the second layer from the bottom are not coincident with positions of the centers of the battery cells 28 in the first layer from the bottom. Among the battery cells 28 in the second layer from the bottom, the first battery cell 28 from the front and the first battery cell 28 from the rear are arranged slightly lower than the other battery cells 28. In the third layer from the bottom, six battery cells 28 are arranged in the front-rear direction. In the front-rear direction, positions of the centers of the battery cells 28 in the third layer from the bottom are not coincident with the positions of the centers of the battery cells 28 in the second layer from the bottom. Among the battery cells 28 in the third layer from the bottom, the second battery cell 28 from the front and the second battery cell 28 from the rear are arranged slightly lower than the other battery cells 28. In the fourth layer from the bottom, i.e., in the first layer from the top, five battery cells 28 are arranged in the front-rear direction. In the front-rear direction, positions of the centers of the battery cells 28 in the fourth layer from the bottom are not coincident with the positions of the centers of the battery cells 28 in the third layer from the bottom. The battery cells 28 in the fourth layer from the bottom are arranged substantially at the same position in the up-down direction.

Figure 6:
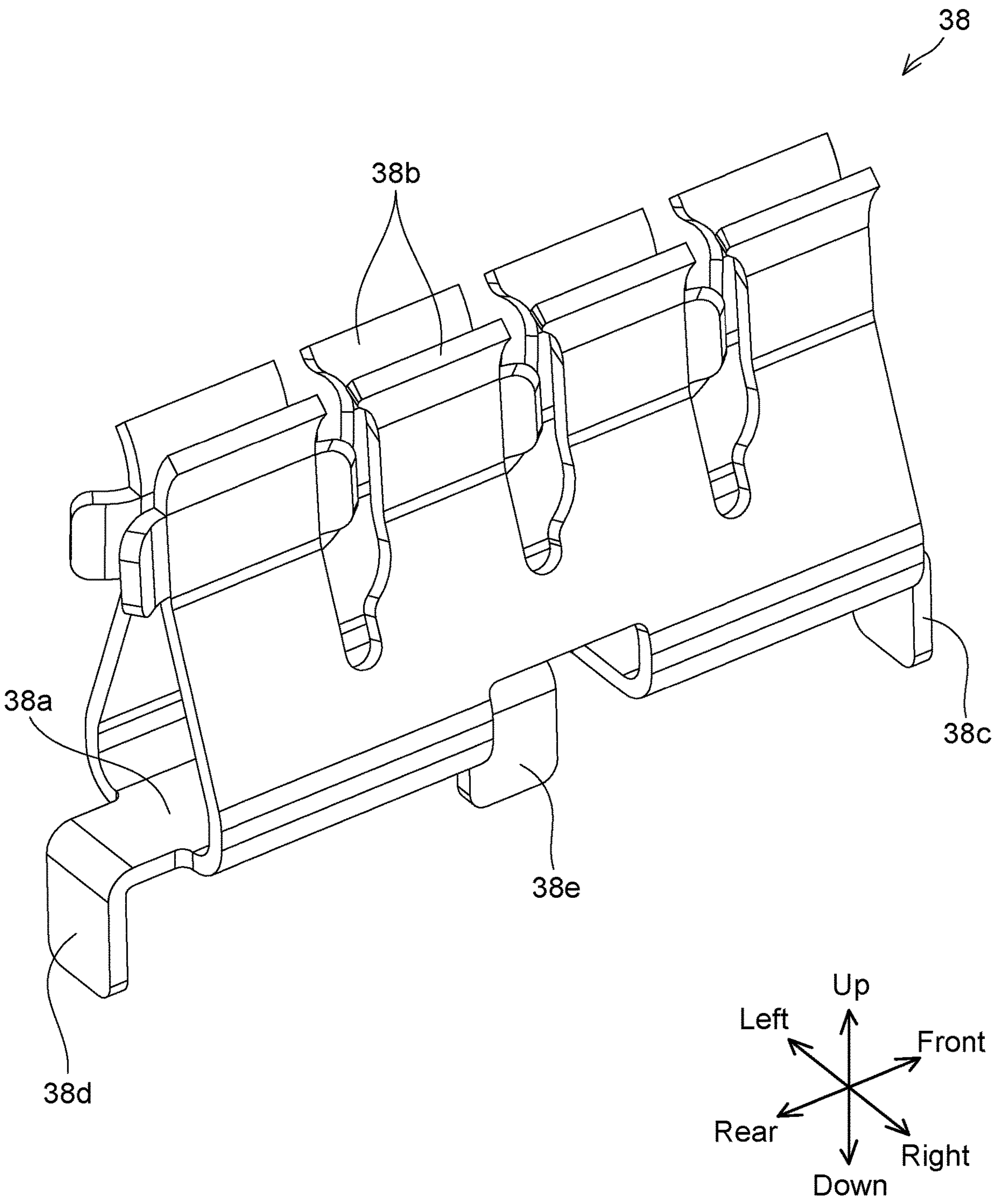
FIG. 6 is a perspective view of a power terminal 38 of the battery pack 2 according to the first embodiment, as viewed from the upper rear right side.
Figure 7:
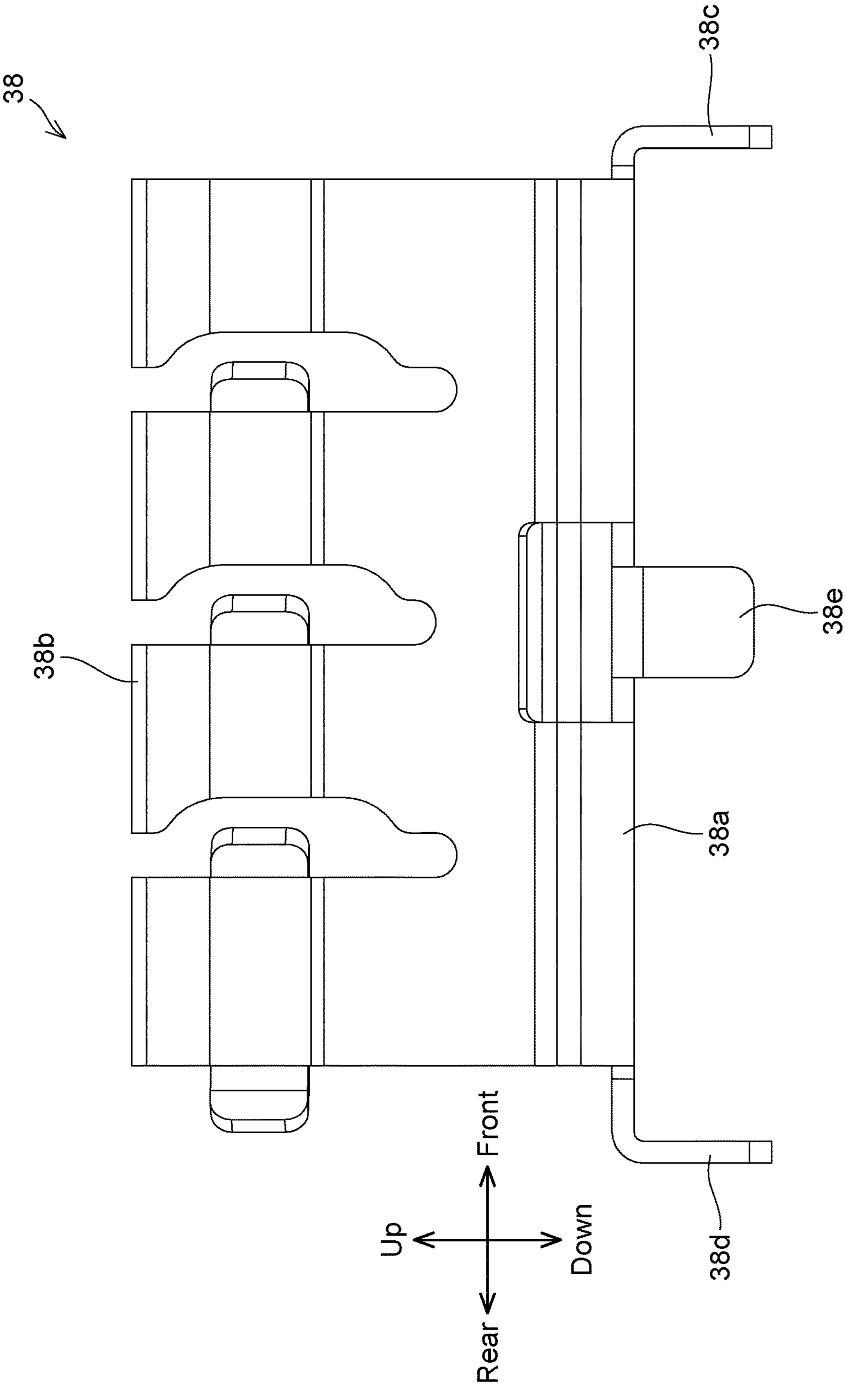
FIG. 7 is a right side view of the power terminal 38 of the battery pack 2 according to the first embodiment.

As illustrated in FIGS. 6 and 7, each power terminal 38 comprises a base portion 38*a*, clamp portions 38*b* bending upward from both of left and right ends of the base portion 38*a*, a front end supporting portion 38*c* bending downward from a front end of the base portion 38*a*, a rear end supporting portion 38*d* bending downward from a rear end of the base portion 38*a*, and a central supporting portion 38*e* bending downward from the left end of the base portion 38*a* in the vicinity of the center of the base portion 38*a* in the front-rear direction. When the battery pack 2 is attached to the electrical device 4, the clamp portions 38*b* elastically clamp a power terminal 14 of the electrical device 4 in the left-right direction. Thus, the power terminal 38 mechanically engages with and electrically connects to the power terminal 14 of the electrical device 4. The front end supporting portion 38*c*, the rear end supporting portion 38*d*, and the central supporting portion 38*e* are soldered to the control circuit board 32 while inserted in holes formed in the control circuit board 32. Thus, the power terminal 38 is mechanically secured to and electrically connected to the control circuit board 32.

Figure 8:
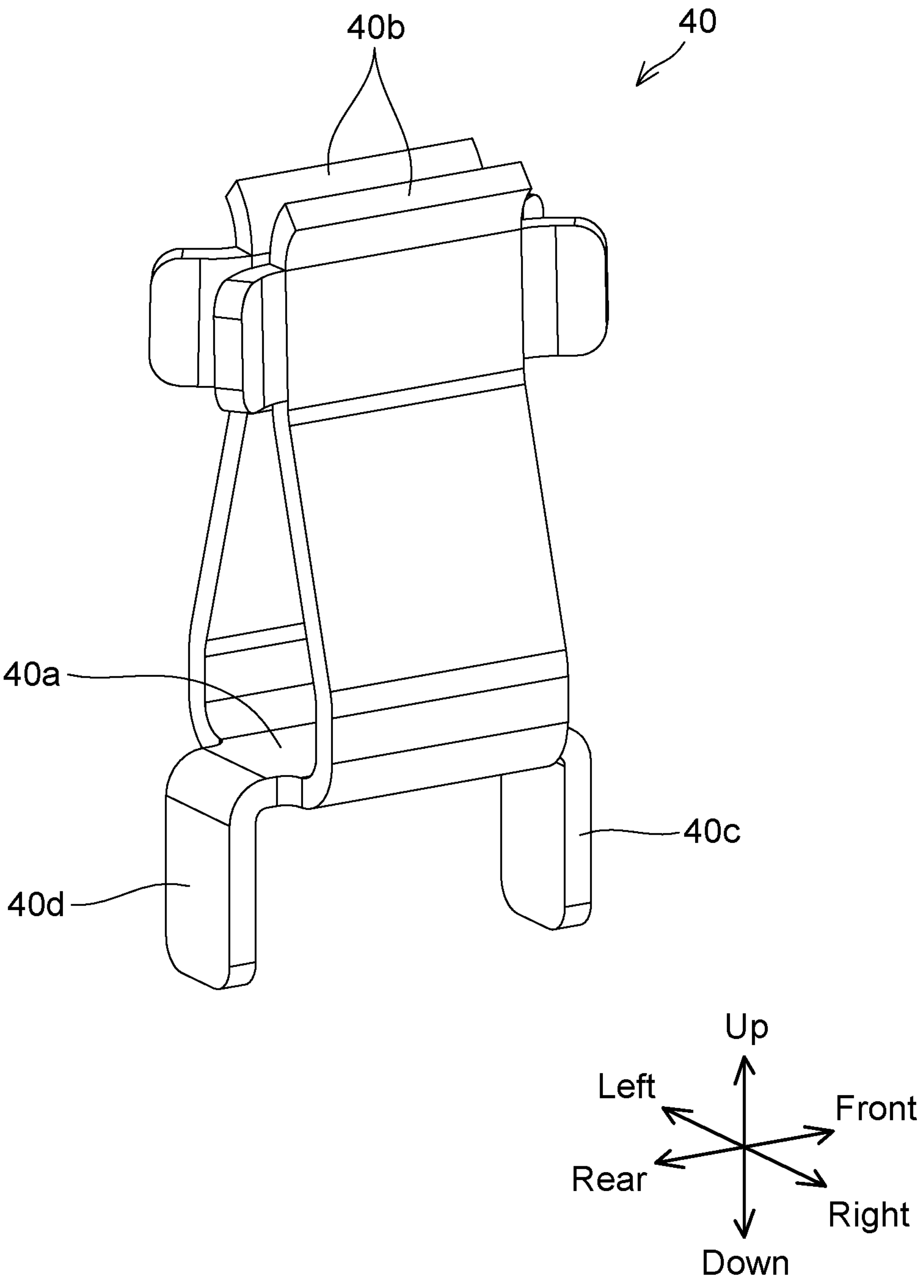
FIG. 8 is a perspective view of a signal terminal 40 of the battery pack 2 according to the first embodiment, as viewed from the upper rear right side.
Figure 9:
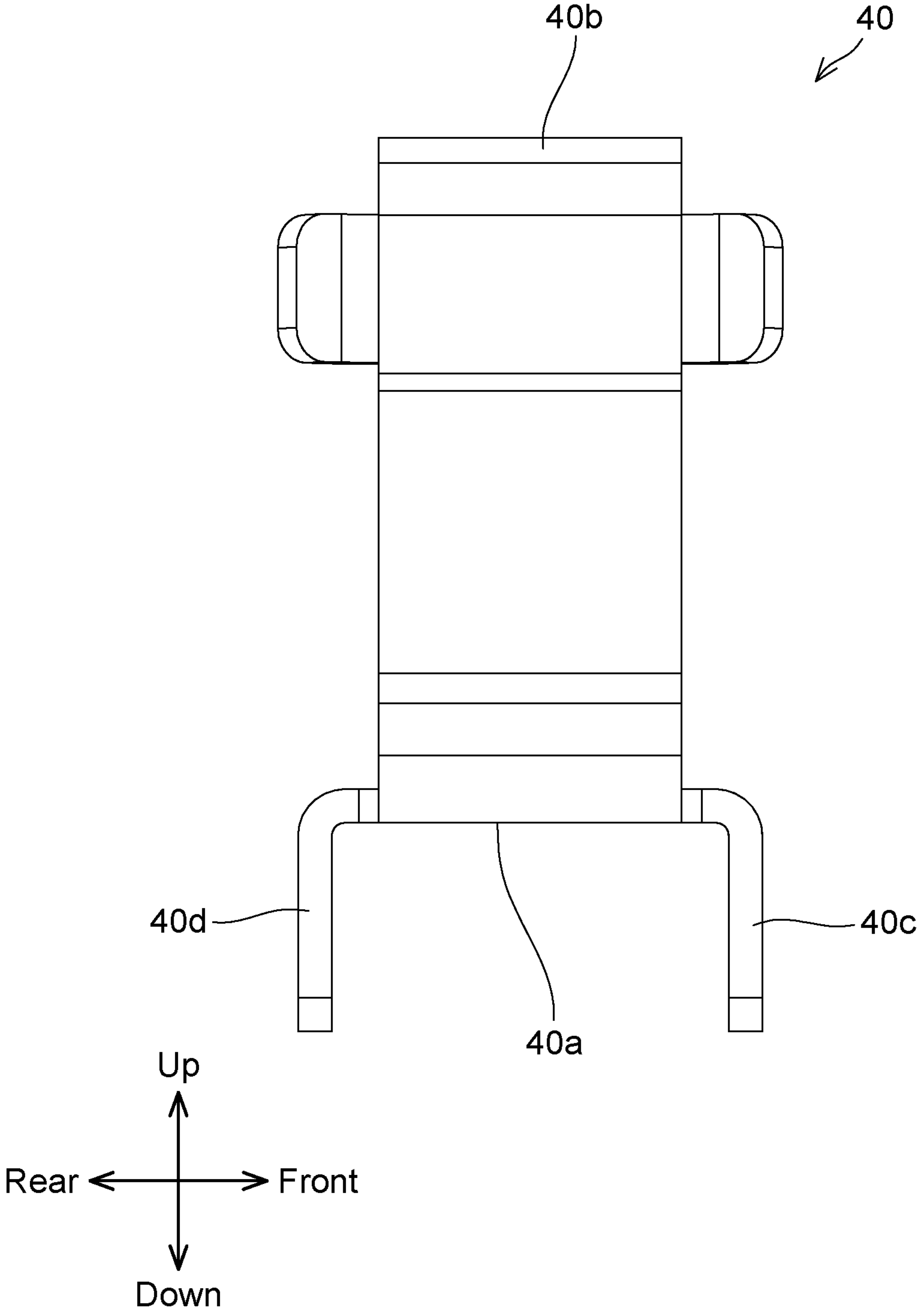
FIG. 9 is a right side view of the signal terminal 40 of the battery pack 2 according to the first embodiment.

As illustrated in FIGS. 8 and 9, each signal terminal 40 comprises a base portion 40*a*, clamp portions 40*b* bending upward from both of left and right ends of the base portion 40*a*, a front end supporting portion 40*c* bending downward from a front end of the base portion 40*a*, and a rear end supporting portion 40*d* bending downward from a rear end of the base portion 40*a*. When the battery pack 2 is attached to the electrical device 4, the clamp portions 40*b* elastically clamp a signal terminal 16 of the electrical device 4 in the left-right direction. Thus, the signal terminal 40 mechanically engages with and electrically connects to the signal terminal 16 of the electrical device 4. The front end supporting portion 40*c* and the rear end supporting portion are soldered to the control circuit board 32 while inserted in holes formed in the control circuit board 32. Thus, the signal terminal 40 is mechanically secured to and electrically connected to the control circuit board 32.

Since a larger current flows through the power terminal 38 as compared to the signal terminal 40, the power terminal 38 has a larger temperature rise accompanying heat generation. Thus, if the power terminal 38 does not comprise the central supporting portion 38*e* and comprises only the front end supporting portion 38*c* and the rear end supporting portion 38*d*, as with the signal terminal 40, a large current flows through each of the front end supporting portion 38*c* and the rear end supporting portion 38*d*, resulting in a very large temperature rise accompanying heat generation. As illustrated in FIGS. 6 and 7, in the battery pack 2 according to the present embodiment, the power terminal 38 electrically connects to the control circuit board 32 via the front end supporting portion 38*c*, the rear end supporting portion 38*d*, and the central supporting portion 38*e*. Therefore, a current flowing through each of the front end supporting portion 38*c*, the rear end supporting portion 38*d*, and the central supporting portion 38*e* can be reduced, and thus the temperature rise accompanying heat generation can be reduced.

As illustrated in FIG. 4, a bracket 42 made of resin is arranged on the upper surface of the control circuit board 32 in order to suppress short circuit between the power terminals 38, between the signal terminals 40, and between the power terminals 38 and the signal terminals 40. Also arranged on the upper surface of the control circuit board 32 is a conductive member 44 made of metal that extends in the front-rear direction at a position spaced upward from the control circuit board 32, has its downwardly bent front end secured to the control circuit board 32, and has its downwardly bent rear end secured to the control circuit board 32. The conductive member 44 is electrically arranged on current paths between the battery cells 28 and the power terminals 38. The presence of the conductive member 44 can reduce heat generation of the control circuit board 32 as compared with a case where all the current paths between the battery cells 28 and the power terminals 38 are implemented as printed wiring on the control circuit board 32. Further, since heat is released from the conductive member 44 to the ambient air, the temperature rise in the control circuit board 32 can be reduced.

Figure 10:
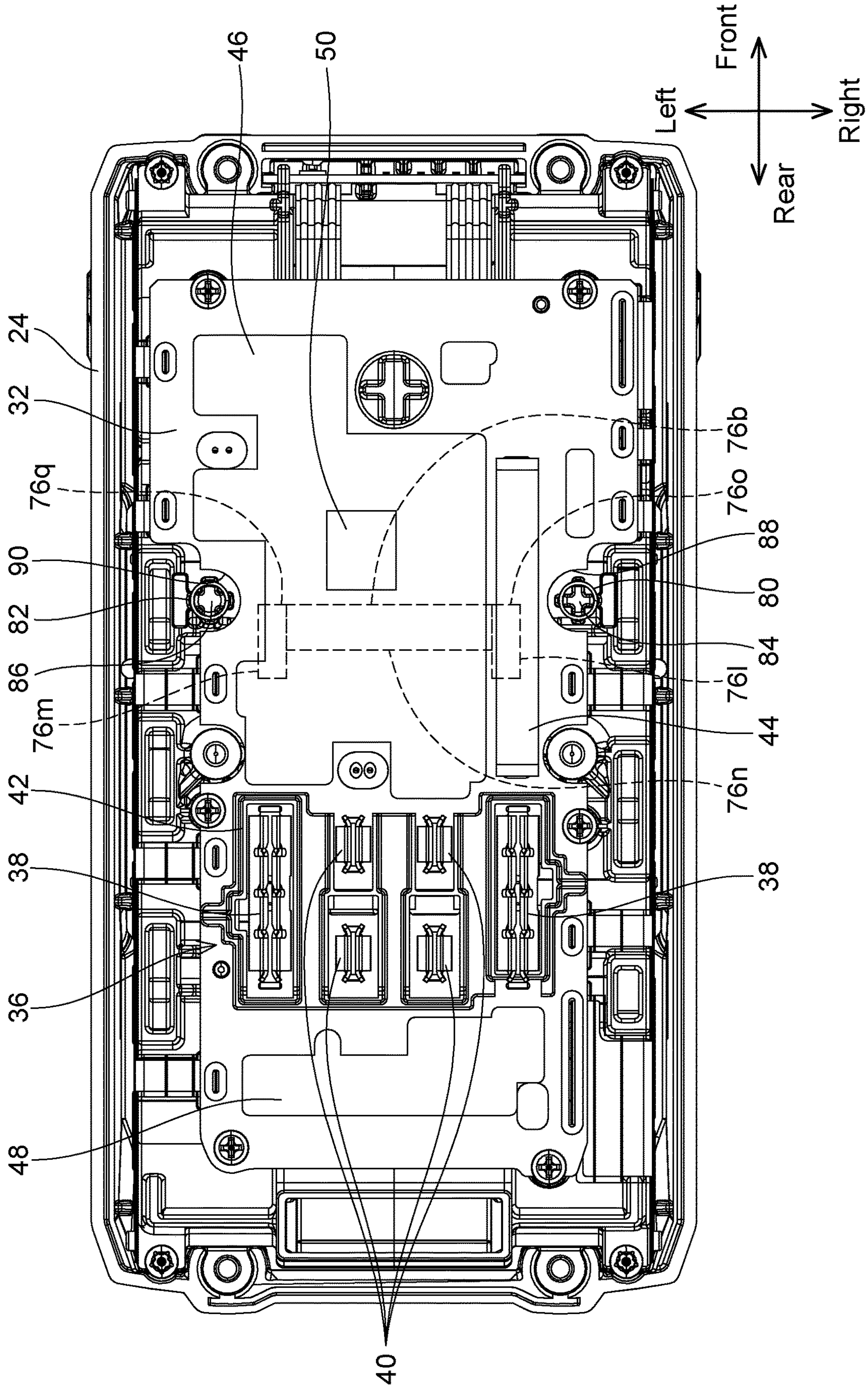
FIG. 10 is a top view of the battery cell unit 22 and a lower casing 24 of the battery pack 2 according to the first embodiment.

As illustrated in FIG. 10, the upper surface of the control circuit board 32 includes circuit element regions 46, 48 on which various circuit elements are mounted. The circuit element region 46 is arranged forward of the battery-side terminal 36. The circuit element region 48 is arranged rearward of the battery-side terminal 36. A microcontroller 50 that controls operation of the battery pack 2 is mounted on the circuit element region 46.

Figure 11:
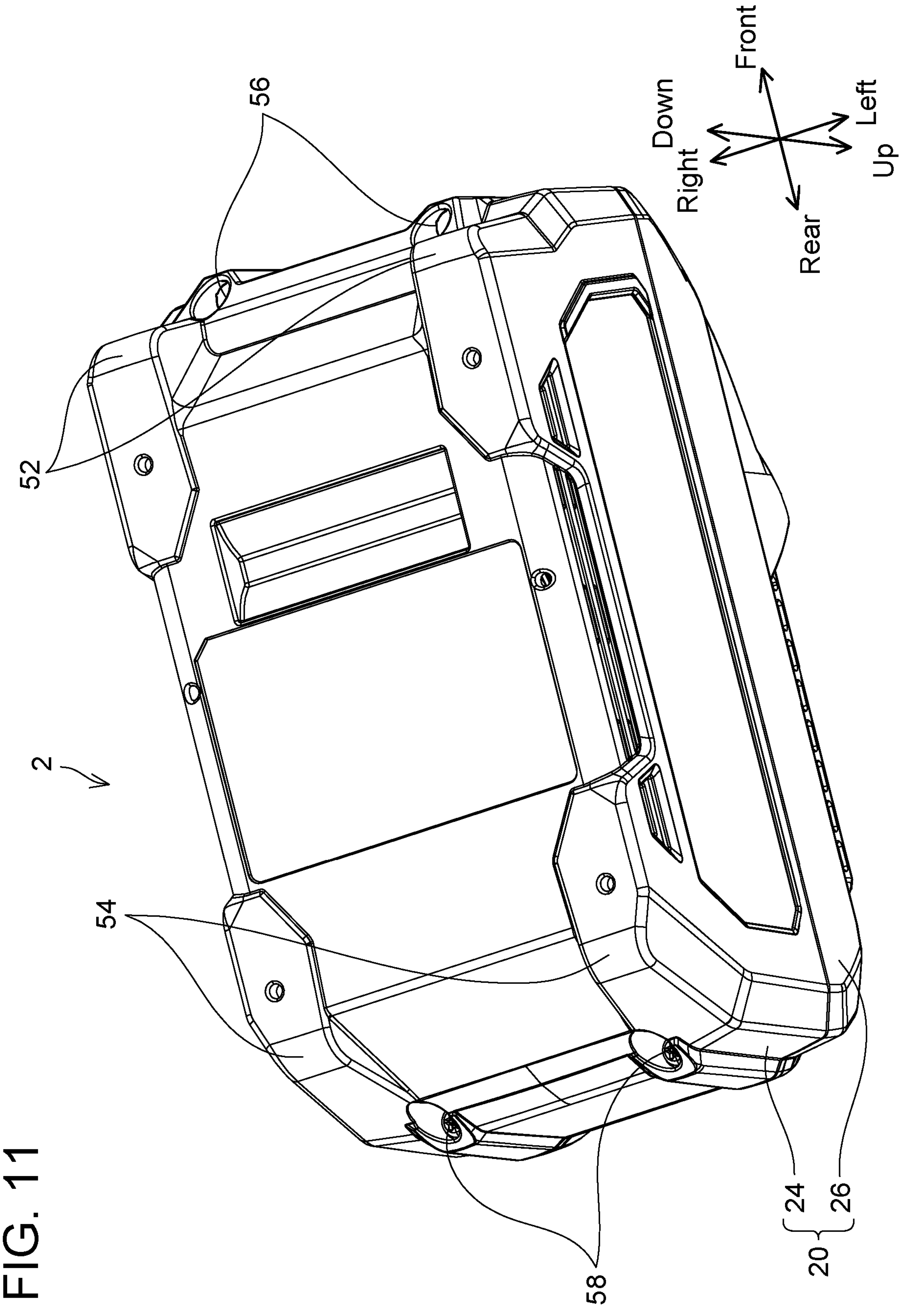
FIG. 11 is a perspective view of the battery pack 2 according to the first embodiment, as viewed from the lower rear left side.
Figure 12:
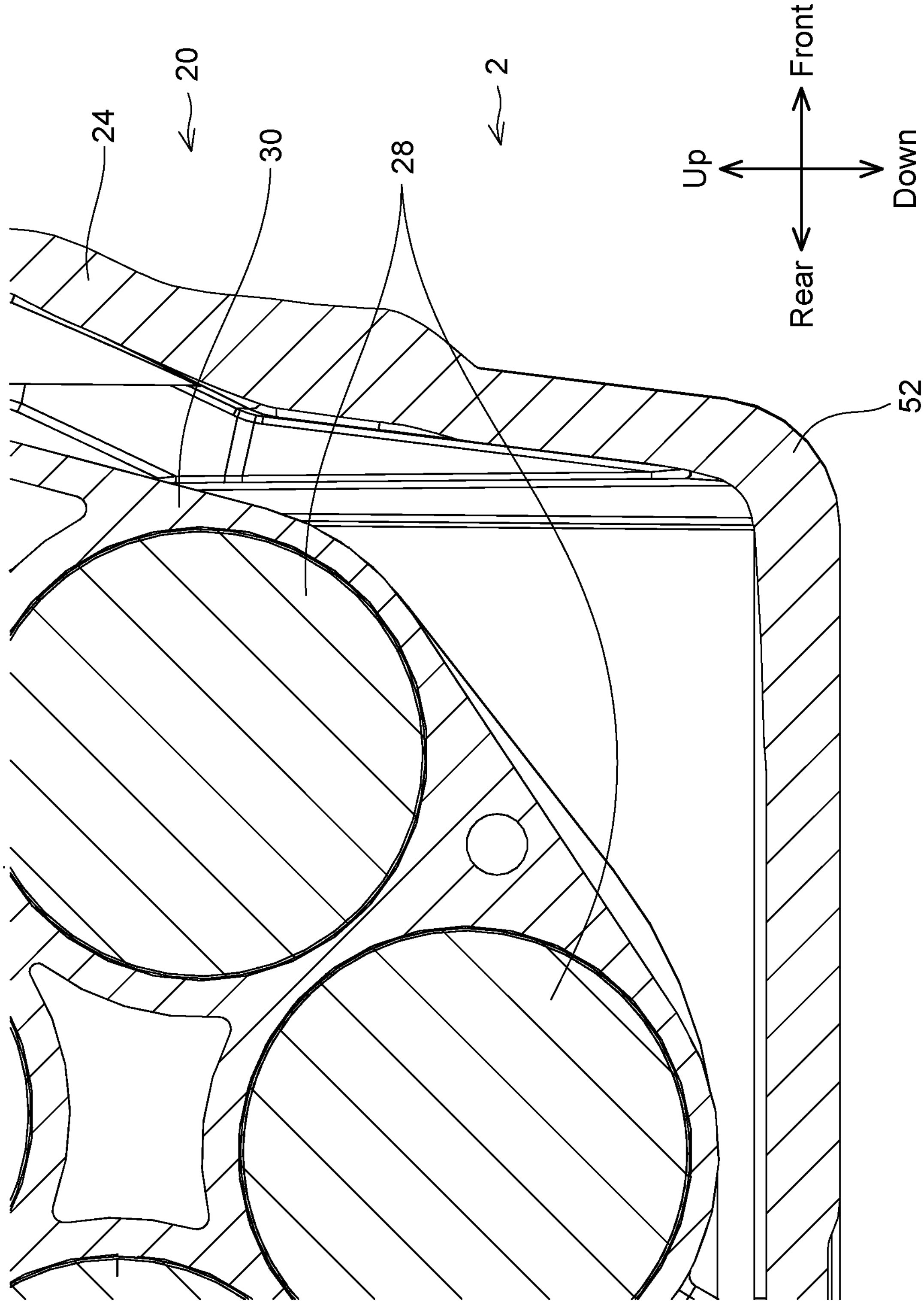
FIG. 12 is a longitudinal cross-sectional view of the battery pack 2 according to the first embodiment in the vicinity of a front guard part 52.
Figure 13:
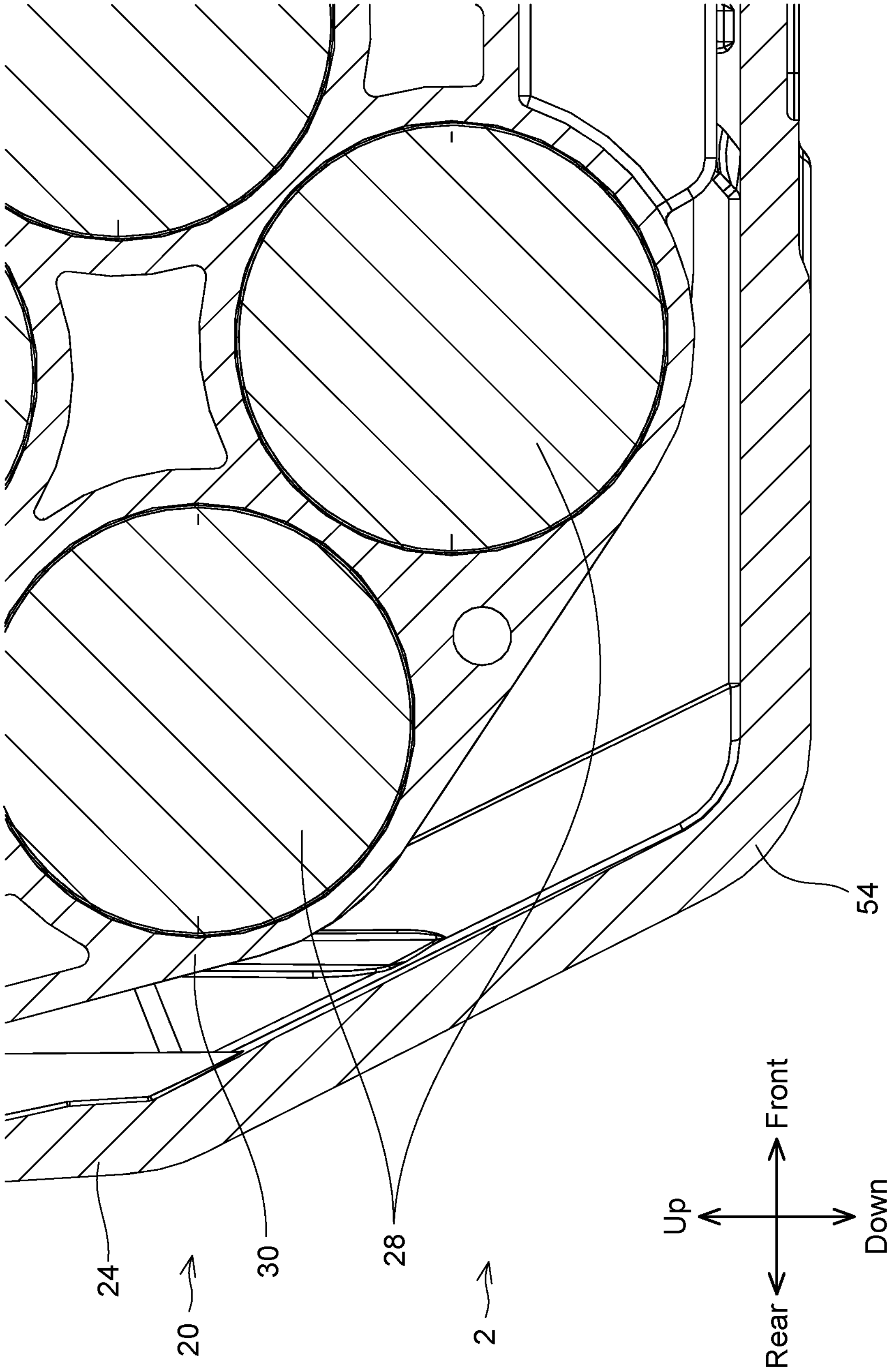
FIG. 13 is a longitudinal cross-sectional view of the battery pack 2 according to the first embodiment in the vicinity of a rear guard part 54.

As illustrated in FIG. 11, at a lower front right end and a lower front left end of the lower casing 24, front guard parts 52 that protrude forward and downward are formed. At a lower rear right end and a lower rear left end of the lower casing 24, rear guard parts 54 that protrude rearward and downward are formed. When the battery pack 2 accidentally falls, the front guard parts 52 or the rear guard parts 54 collide with the ground or a floor surface. As illustrated in FIG. 12, a front guard part 52 is arranged to face a surface of the cell holder 30 that extends over two battery cells 28 that are close to the front guard part 52, and a clearance of 13.0 mm or more is ensured between that surface of the cell holder 30 and the front guard part 52. Thus, even if the front guard part 52 is deformed by a collision, damage to the battery cells 28 can be suppressed. Further, as illustrated in FIG. 13, a rear guard part 54 is arranged to face a surface of the cell holder 30 that extends over two battery cells 28 that are close to the rear guard part 54, and a clearance of 9.0 mm or more is ensured between that surface of the cell holder 30 and the rear guard part 54. Thus, even if the rear guard part 54 is deformed by a collision, damage to the battery cells 28 can be suppressed.

As illustrated in FIG. 11, the lower casing 24 and the upper casing 26 are secured to each other with two bolts 56 arranged in a front portion of the battery pack 2 and two bolts 58 arranged in a rear portion of the battery pack 2. As illustrated in FIG. 5, a bolt 56 extends through a bolt receiving portion 60 formed near a front end of the lower casing 24 from below and is screwed in a bolt hole 62 formed near a front end of the upper casing 26. A head 56*a* of the bolt 56 is positioned below a lower end of the battery cell 28 arranged closest to the front among the plurality of battery cells 28 (in the present embodiment, the first battery cell 28 from the front in the third layer from the bottom). This configuration allows the bolt 56 to be arranged close to the plurality of battery cells 28, thereby reducing the dimension of the battery pack 2 in the front-rear direction. Further, a bolt 58 extends through a bolt receiving portion 64 formed near a rear end of the lower casing 24 from below and is screwed in a bolt hole 66 formed near a rear end of the upper casing 26. A head 58*a* of the bolt 58 is positioned below a lower end of the battery cell 28 arranged closest to the rear among the plurality of battery cells 28 (in the present embodiment, the first battery cell 28 from the rear in the third layer from the bottom). This configuration allows the bolt 58 to be arranged close to the plurality of battery cells 28, thereby reducing the dimension of the battery pack 2 in the front-rear direction.

As illustrated in FIG. 1, terminal openings 68, battery-side rails 70, an engagement opening 72, and a manipulation opening 74 are formed in an upper surface of the upper casing 26. The terminal openings 68 are arranged at positions corresponding to the battery-side terminal 36 (see FIG. 4). When the battery pack 2 is attached to the electrical device 4, the device-side terminal 8 (see FIG. 3) of the electrical device 4 enters the inside of the upper casing 26 via the terminal openings 68. Thus, the device-side terminal 8 mechanically engages with and electrically connects to the battery-side terminal 36. The battery-side rails 70 extend along the front-rear direction and are arranged on left and right sides of the terminal openings 68. When the battery pack 2 is attached to the electrical device 4, the battery-side rails 70 engage with the device-side rails 10 (see FIG. 3) of the electrical device 4 so as to be slidable in the front-rear direction. The engagement opening 72 is arranged forward of the terminal openings 68. An engaging member 76 is attached to the engagement opening 72. The manipulation opening 74 is arranged forward of the engagement opening 72. A manipulatable member 78 is attached to the manipulation opening 74.

Figure 14:
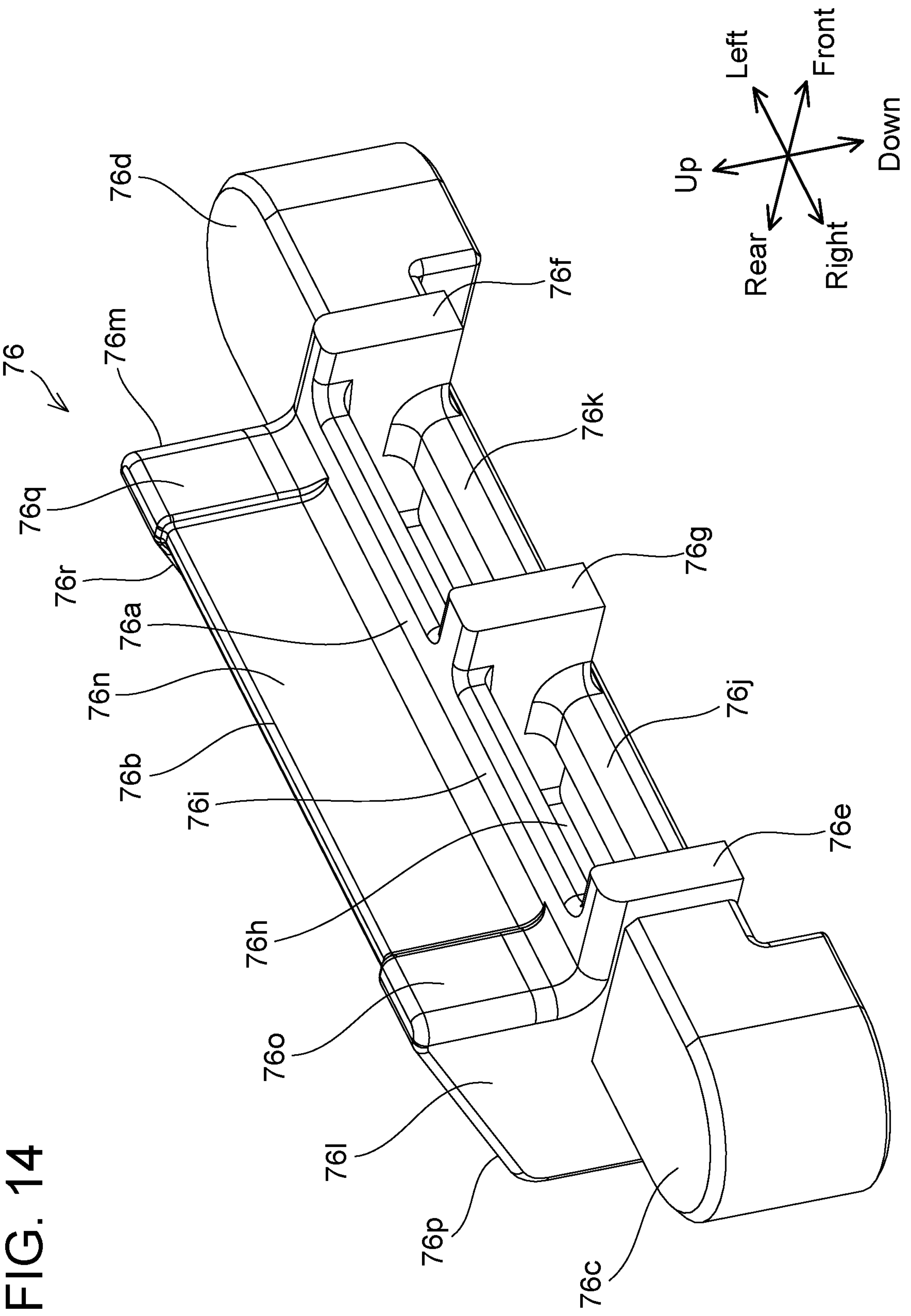
FIG. 14 is a perspective view of an engaging member 76 of the battery pack 2 according to the first embodiment, as viewed from the upper front right side.

As illustrated in FIG. 14, the engaging member 76 comprises a base portion **76*a*, an engaging portion 76*b* protruding upward from the base portion 76*a*, a right supporting portion 76*c* arranged rightward of the base portion 76*a*, and a left supporting portion 76*d* arranged leftward of the base portion 76*a*. The base portion 76*a* comprises a right wall 76*e* arranged along the front-rear direction and the up-down direction at a right end of the base portion 76*a*; a left wall 76*f* arranged along the front-rear direction and the up-down direction at a left end of the base portion 76*a*; a central wall 76*g* arranged along the front-rear direction and the up-down direction at the center of the base portion 76*a* in the left-right direction; a rear wall 76*h* arranged along the left-right direction and the up-down direction and connecting a rear portion of the right wall 76*e*, a rear portion of the left wall 76*f*, and a rear portion of the central wall 76*g*; an upper wall 76*i* arranged along the front-rear direction and the left-right direction and connecting an upper rear portion of the right wall 76*e*, an upper rear portion of the left wall 76*f*, and an upper rear portion of the central wall 76*g*; a right beam 76*j* extending in the left-right direction and connecting a lower central portion of the right wall 76*e* in the front-rear direction and a lower central portion of the central wall 76*g* in the front-rear direction; and a left beam 76*k* extending in the left-right direction and connecting a lower central portion of the left wall 76*f* in the front-rear direction and the lower central portion of the central wall 76*g* in the front-rear direction. The engaging portion 76*b* comprises a right engaging portion 761 arranged at a right end of the engaging portion 76*b*, a left engaging portion 76*m* arranged at a left end of the engaging portion 76*b*, and a connecting portion 76*n* connecting the right engaging portion 761 and the left engaging portion 76*m*. The right engaging portion 761 comprises a right engaging surface 76*o* arranged along the left-right direction and the up-down direction and facing forward; and a right inclined surface 76*p* arranged rearward of the right engaging surface 76*o* so as to face rearward and upward, and inclined downward from above as it extends from the front to rear. The left engaging portion 76*m* comprises a left engaging surface 76*q* arranged along the left-right direction and the up-down direction and facing forward; and a left inclined surface 76*r* arranged rearward of the left engaging surface 76*q*** so as to face rearward and upward, and inclined downward from above as it extends from the front to rear.

Figure 15:
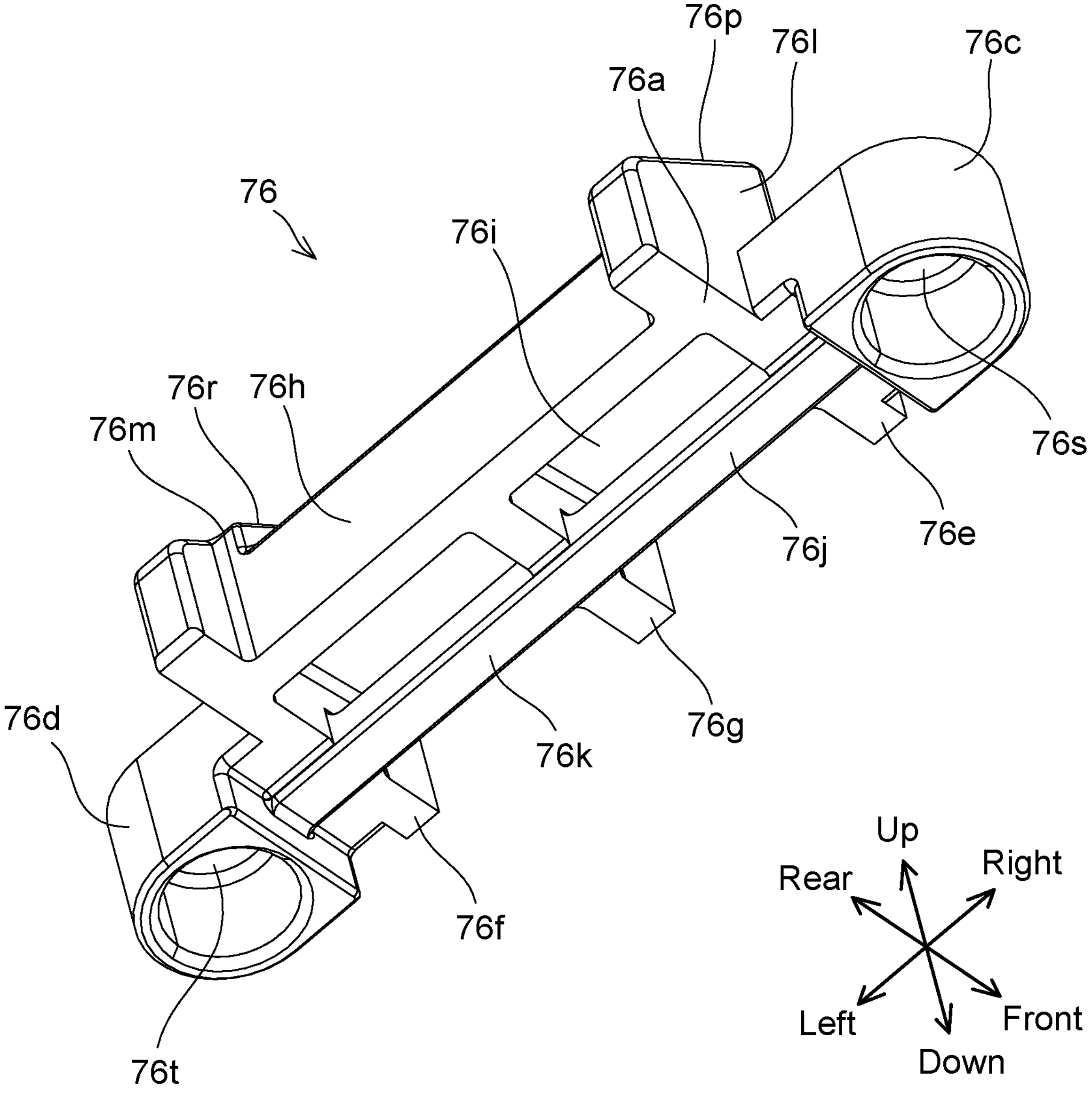
FIG. 15 is a perspective view of the engaging member 76 of the battery pack 2 according to the first embodiment, as viewed from the lower rear right side.

As illustrated in FIG. 15, the right supporting portion **76*c* comprises a spring receiving groove 76*s* that is open downward and has a substantially cylindrical shape. The left supporting portion 76*d* comprises a spring receiving groove 76*t* that is open downward and has a substantially cylindrical shape. A compression spring 80 (see FIG. 4) is attached to the spring receiving groove 76*s*. A compression spring 82 (see FIG. 4) is attached to the spring receiving groove 76*t*. As illustrated in FIG. 4, a spring supporting portion 84 supporting the compression spring 80 and a spring supporting portion 86 supporting the compression spring 82 are formed on an upper portion of the cell holder 30. The control circuit board 32 comprises a notch 88 extending leftward from the right edge and a notch 90 extending rightward from the left edge. The spring supporting portion 84 extends through the notch 88 and protrudes upward. The spring supporting portion 86 extends through the notch 90 and protrudes upward. The compression springs 80, 82 bias the engaging member 76 upward with respect to the cell holder 30**.

Figure 16:
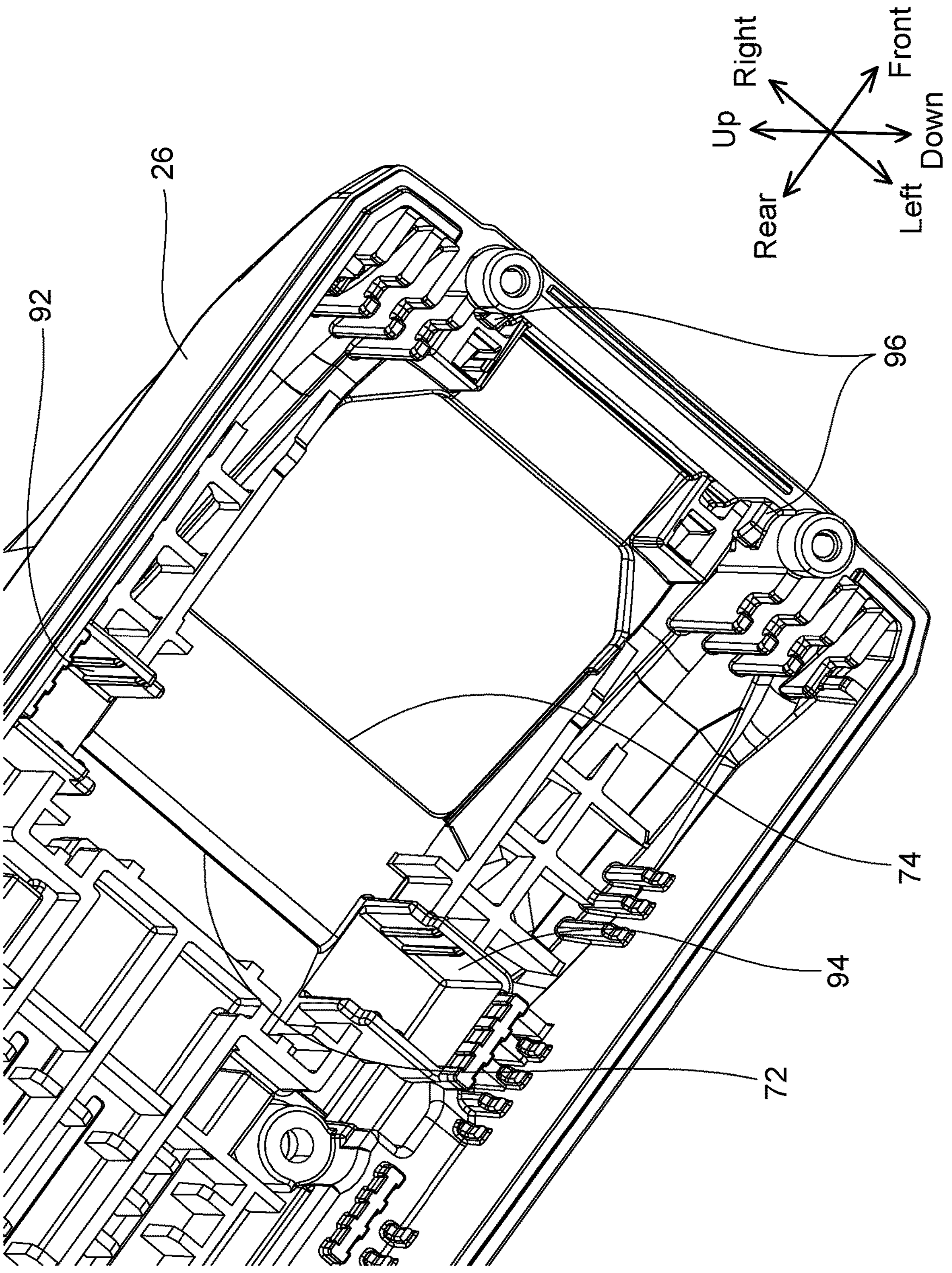
FIG. 16 is a perspective view of a front portion of an upper casing 26 of the battery pack 2 according to the first embodiment, as viewed from the lower rear right side.
Figure 17:
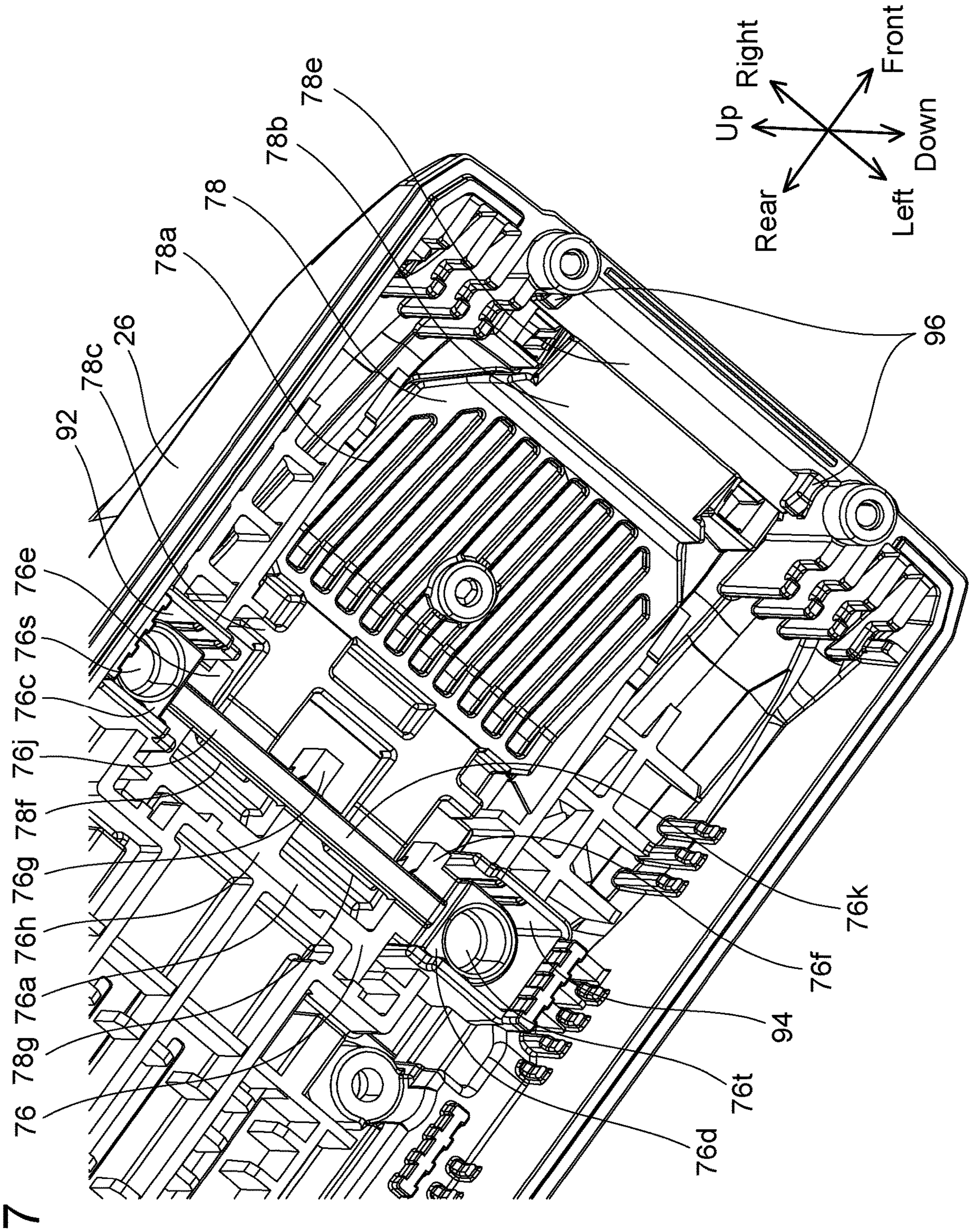
FIG. 17 is a perspective view of the front portion of the upper casing 26 in the state where the engaging member 76 and a manipulatable member 78 are attached to the upper casing 26 in the battery pack 2 according to the first embodiment, as viewed from the lower rear right side.

As illustrated in FIG. 16, a right guide portion 92 and a left guide portion 94 are formed on an inner surface of the upper casing 26 near the engagement opening 72. The right guide portion 92 receives the right supporting portion **76*c* of the engaging member 76 such that it is movable in the up-down direction but immovable in the front-rear direction and the right direction. The left guide portion 94 receives the left supporting portion 76*d* of the engaging member 76 such that it is movable in the up-down direction but immovable in the front-rear direction and the left direction. As illustrated in FIG. 17, the engaging member 76 is attached to the upper casing 26 such that the engaging portion 76*b* protrudes to the outside of the upper casing 26 from the engagement opening 72, the right supporting portion 76*c* is received in the right guide portion 92, and the left supporting portion 76*d* is received in the left guide portion 94**.

Figure 18:
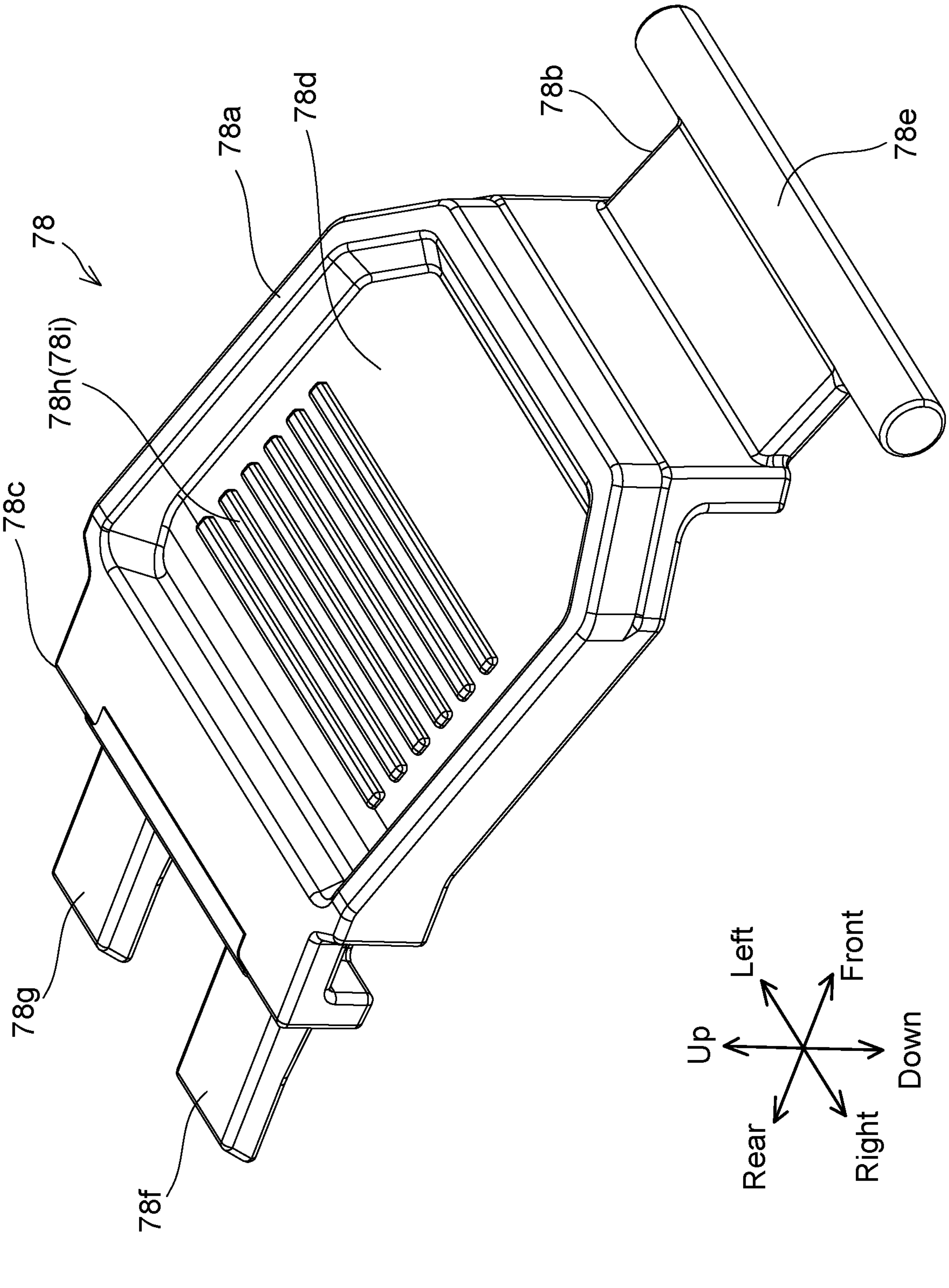
FIG. 18 is a perspective view of the manipulatable member 78 of the battery pack 2 according to the first embodiment, as viewed from the upper front right side.
Figure 19:
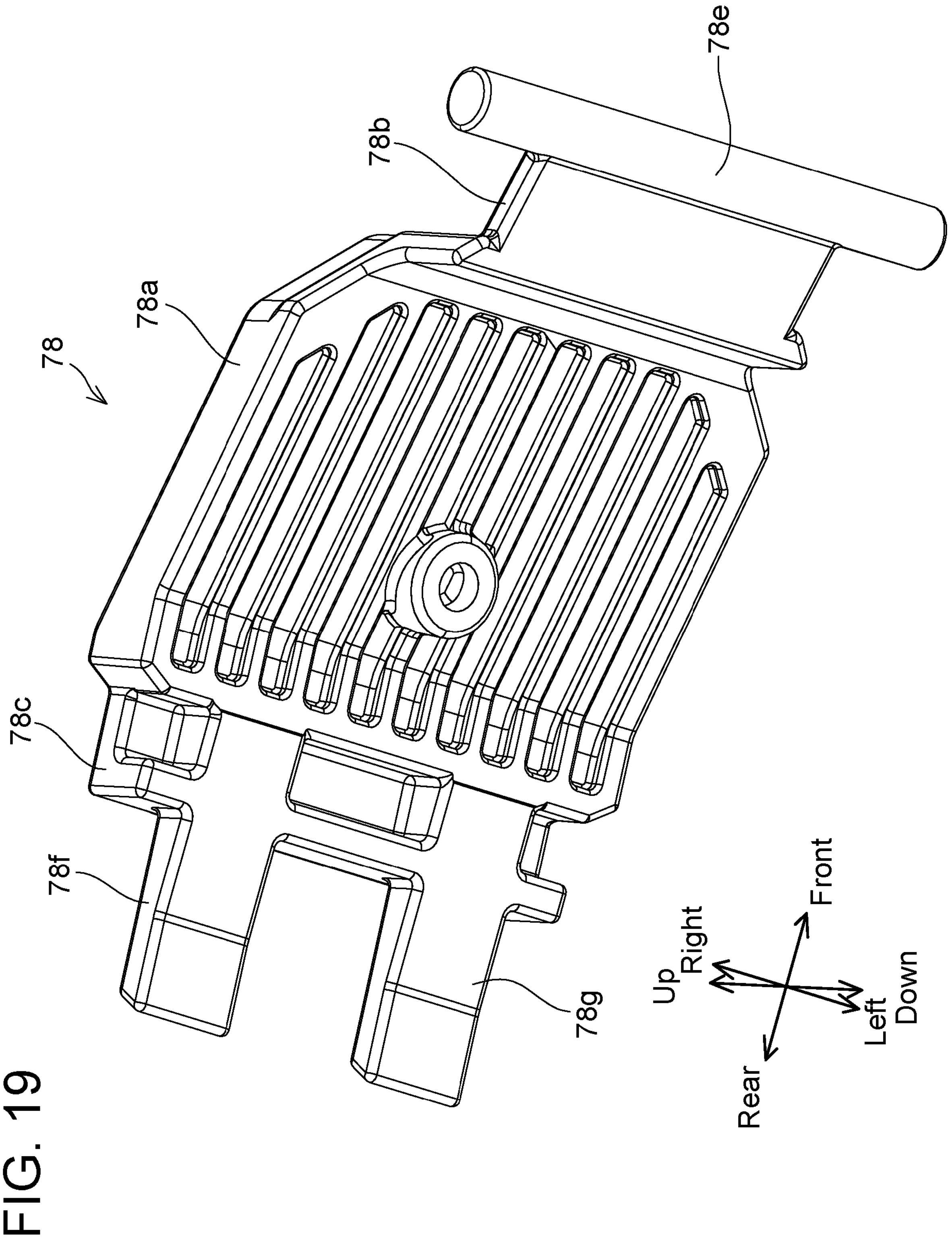
FIG. 19 is a perspective view of the manipulatable member 78 of the battery pack 2 according to the first embodiment, as viewed from the lower rear right side.

As illustrated in FIGS. 18 and 19, the manipulatable member 78 comprises a manipulatable portion **78*a*, a supporting portion 78*b* arranged forward and downward of the manipulatable portion 78*a*, and an abutment portion 78*c* arranged rearward of the manipulatable portion 78*a*. The manipulatable portion 78*a* comprises a manipulatable surface 78*d* that is subjected to a user's pressing manipulation and has a substantially planar shape. A plurality of (e.g., six) convex lines 78*h* protruding outward from the manipulatable surface 78*d* is formed on the manipulatable surface 78*d*. The plurality of convex lines 78*h* are arranged parallel to each other along the left-right direction. The plurality of convex lines 78*h* configures an anti-slip portion 78*i* that suppresses a fingertip of the user from slipping. It should be noted that the number of the plurality of convex lines 78*h* may be two, three, four, five, or seven or more. Further, the anti-slip portion 78*i* may comprise a plurality of (e.g., six) concave lines (not illustrated) in addition to or instead of the plurality of convex lines 78*h*. Alternatively, the anti-slip portion 78*i* may be configured of other regularly arranged convex shapes and/or concave shapes, such as a plurality of protrusions or a plurality of recesses arranged at intersections of a grid. As illustrated in FIG. 1, the anti-slip portion 78*i* is arranged, on the manipulatable surface 78*d*, on a side closer to the engaging member 76. In other words, the center of the plurality of convex lines 78*h* in the front-rear direction is offset rearward of (i.e., is closer to the engaging member 76 than) the center of the manipulatable surface 78*d* in the front-rear direction. As illustrated in FIGS. 18 and 19, the supporting portion 78*b* comprises a pivot shaft 78*e* extending in the left-right direction. The abutment portion 78*c* comprises a right abutment piece 78*f* extending rearward and a left abutment piece 78*g* extending rearward. The right abutment piece 78*f* and the left abutment piece 78*g*** are arranged side by side in the left-right direction.

As illustrated in FIG. 16, a shaft holding portion 96 is formed on the inner surface of the upper casing 26 near a front end thereof. The shaft holding portion 96 holds the manipulatable member 78 at right and left ends of the pivot shaft 78*e* thereof such that it is pivotable. As illustrated in FIG. 17, the manipulatable member 78 is attached to the upper casing 26 such that the right abutment piece 78*f* and the left abutment piece 78*g* are inserted in the base portion 76*a* of the engaging member 76, the manipulatable surface 78*d* of the manipulatable portion 78*a* is exposed to the outside of the upper casing 26 via the manipulation opening 74, and the pivot shaft 78*e* of the supporting portion 78*b* is held by the shaft holding portion 96.

Figure 20:
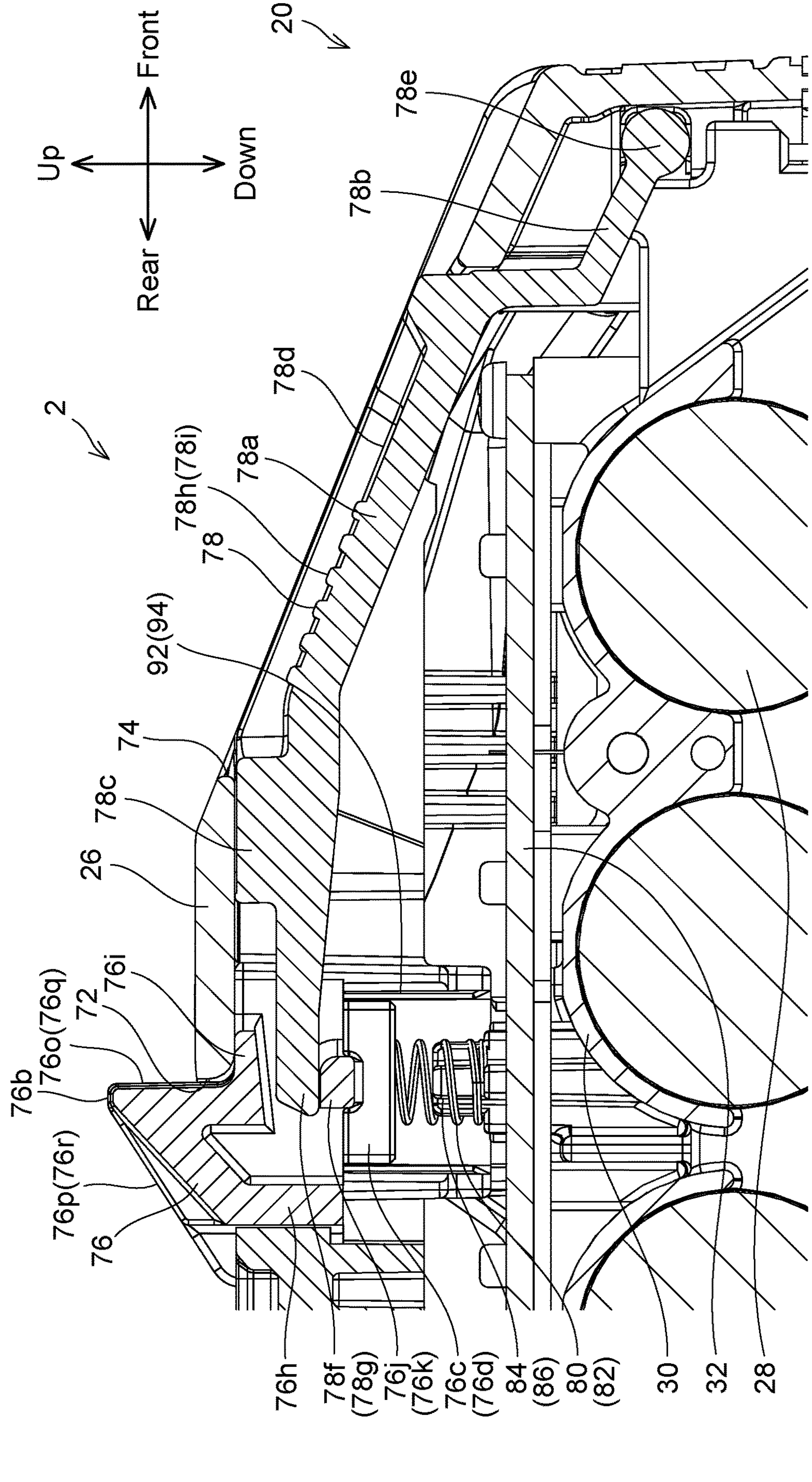
FIG. 20 is a longitudinal cross-sectional view of the battery pack 2 according to the first embodiment in the vicinity of an area where the engaging member 76 abuts the manipulatable member 78.

As illustrated in FIG. 20, in the state where the engaging member 76 and the manipulatable member 78 are attached to the upper casing 26, the right abutment piece 78*f* of the manipulatable member 78 is arranged above the right beam 76*j* of the engaging member 76 and the left abutment piece 78*g* of the manipulatable member 78 is arranged above the left beam 76*k* of the engaging member 76. Thus, by the compression springs 80, 82 biasing the engaging member 76 upward with respect to the cell holder 30, the engaging member 76 is pressed against the upper casing 26, and the right abutment piece 78*f* and the left abutment piece 78*g* of the manipulatable member 78 are pushed upward by the right beam 76*j* and the left beam 76*k* of the engaging member 76, as a result of which the manipulatable member 78 is also pressed against the upper casing 26.

Figure 21:
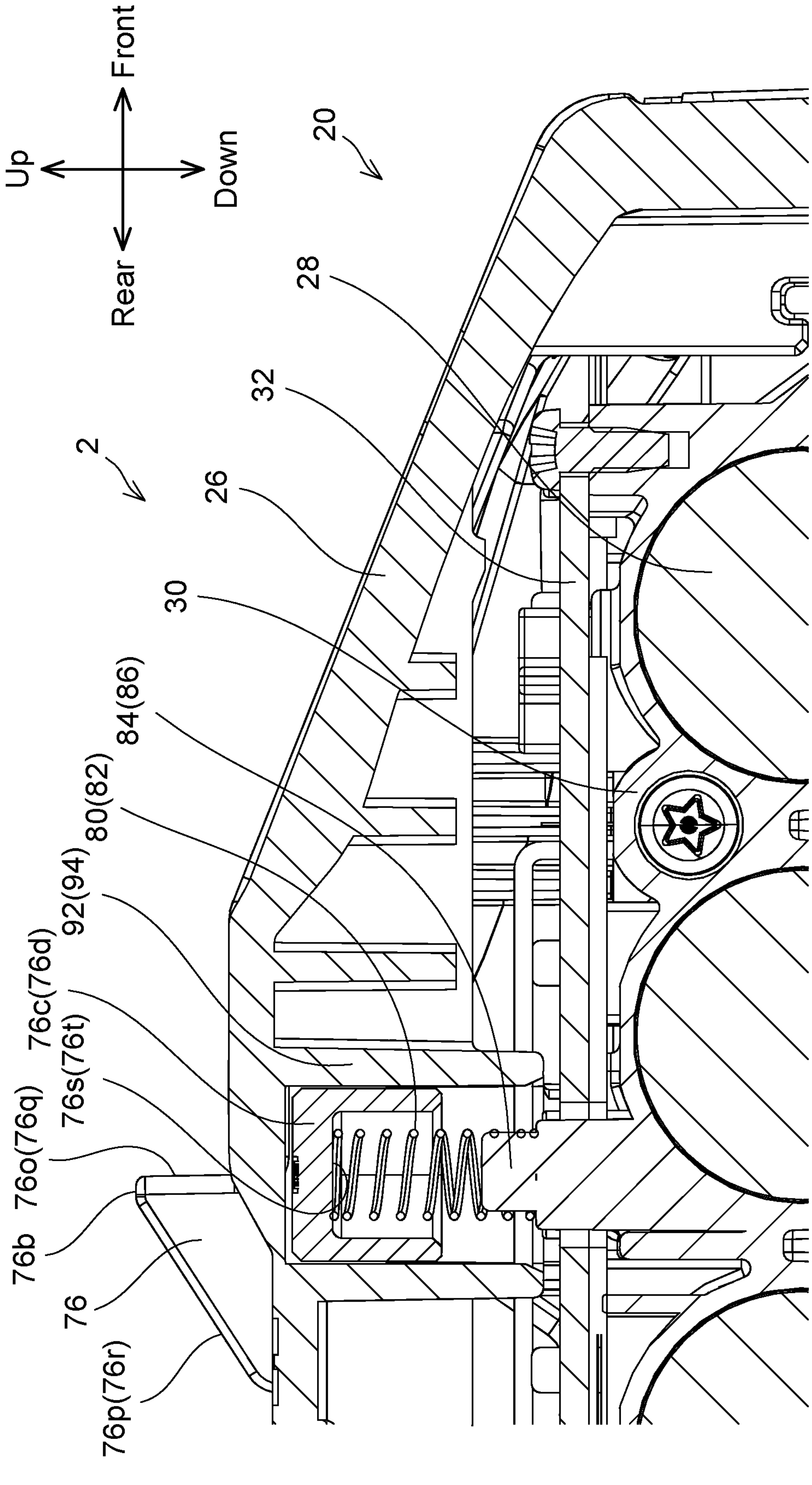
FIG. 21 is a longitudinal cross-sectional view of the battery pack 2 according to the first embodiment in the vicinity of compression springs 80, 82.

Referring to FIG. 21, behavior of the engaging member 76 during attachment of the battery pack 2 to the electrical device 4 is described. When the battery pack 2 is attached to the electrical device 4, the housing 18 (see FIG. 3) of the electrical device 4 abuts the right inclined surface 76*p* and the left inclined surface 76*r* of the engaging member 76 and moves from the rear to front, and thus the engaging member 76 is pressed downward against the biasing force of the compression springs 80, 82. Then, once the engaging groove 12 (see FIG. 3) of the electrical device 4 moves to above the engaging portion 76*b* of the engaging member 76, the engaging member 76 is pushed upward by the biasing force of the compression springs 80, 82 and the engaging portion 76*b* enters the engaging groove 12. In this state, the right engaging surface 76*o* and the left engaging surface 76*q* of the engaging member 76 are arranged to face the engaging surface 12*a* (see FIG. 3) of the electrical device 4, and thus the battery pack 2 is prohibited to slide forward with respect to the electrical device 4. Thus, detachment of the battery pack 2 from the electrical device 4 is prohibited.

Referring to FIG. 20, behavior of the engaging member 76 during detachment of the battery pack 2 from the electrical device 4 is described. When detaching the battery pack 2 from the electrical device 4, the user performs a press-down manipulation on the manipulatable surface 78*d* of the manipulatable member 78. By this manipulation, the manipulatable member 78 pivots about a pivot axis, which is the pivot shaft 78*e*, and the right beam 76*j* and the left beam 76*k* of the engaging member 76 are pushed downward by the right abutment piece 78*f* and the left abutment piece 78*g* of the manipulatable member 78, and thus the engaging member 76 is pushed downward against the biasing force of the compression springs 80, 82. As a result, the engaging portion 76*b* of the engaging member 76 exits from the engaging groove 12 of the electrical device 4, and the battery pack 2 is allowed to slide forward with respect to the electrical device 4. By sliding the battery pack 2 forward with respect to the electrical device 4 in that state, the user can detach the battery pack 2 from the electrical device 4.

Figure 31:
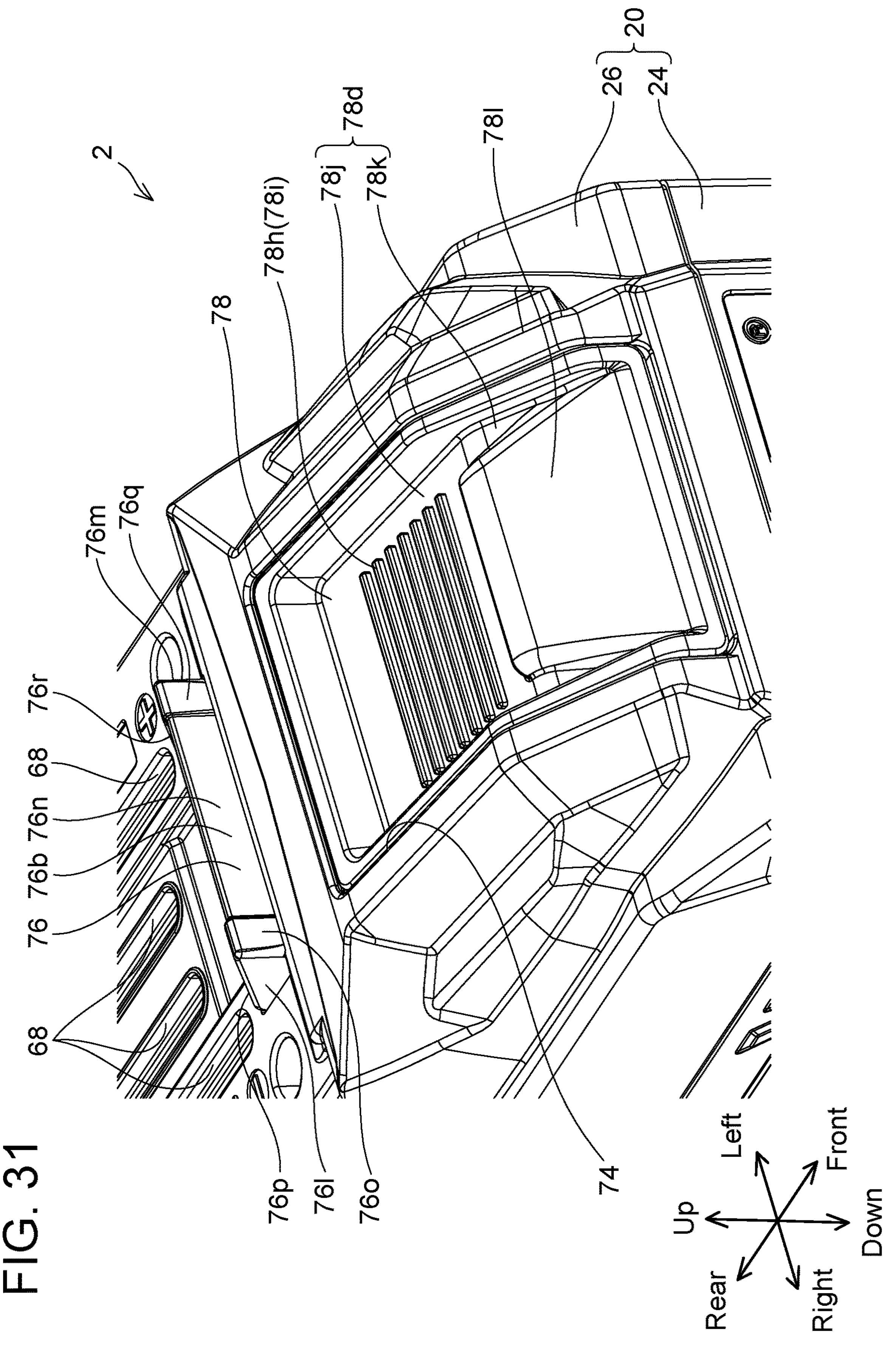
FIG. 31 is a perspective view of the battery pack 2 according to the first embodiment in the vicinity of the manipulatable member 78, as viewed from the upper front right side.

It should be noted that in the battery pack 2, the manipulatable surface 78*d* of the manipulatable member 78 may be configured in the shape illustrated in FIG. 31. In the example shown in FIG. 31, the manipulatable surface 78*d* comprises a first manipulatable surface 78*j* that has a substantially planar shape and a second manipulatable surface 78*k* that bends forward and downward from a front end of the first manipulatable surface 78*j* and has a substantially planar shape. The anti-slip portion 78*i* configured of the plurality of convex lines 78*h* is formed on the first manipulatable surface 78*j*. A finger pad portion 78*l* that is wide and protruding outward from the second manipulatable surface 78*k* is formed on the second manipulatable surface 78*k*. In the example shown in FIG. 31, when the user is to press the manipulatable surface 78*d* with a finger of a hand that grabs the battery pack 2, the user can press the anti-slip portion 78*i* with the fingertip (distal segment of the finger) while placing the proximal or middle segment of the finger on the finger pad portion 78*l*, and thus the pressing manipulation on the manipulatable surface 78*d* can be facilitated. In the example shown in FIG. 31 as well, the anti-slip portion 78*i* is arranged, on the manipulatable surface 78*d*, on the side closer to the engaging member 76. In other words, the center of the plurality of convex lines 78*h* in the front-rear direction is offset rearward (i.e., is closer to the engaging member 76 than) the center of the manipulatable surface 78*d* in the front-rear direction.

As described above, in one or more embodiments, the battery pack 2 is configured to be detachably attached to the battery pack-mount part 6 of the electrical device 4 by being slid with respect to the battery pack-mount part 6. The front direction is defined as a direction in which the battery pack 2 is slid when the battery pack 2 is detached from the battery pack-mount part 6, the rear direction is defined as a direction in which the battery pack 2 is slid when the battery pack 2 is attached to the battery pack-mount part 6, the up direction is defined as a direction in which the battery pack-mount part 6 is positioned as viewed from the battery pack 2 in the state where the battery pack 2 is attached to the battery pack-mount part 6, and the down direction is defined as a direction opposite to the up direction. The battery pack 2 comprises the casing 20, the battery cells 28 housed inside the casing 20, the control circuit board 32 (an example of circuit board) housed inside the casing 20, the engaging member 76 held by the casing 20 so as to be movable in the up-down direction, the compression spring 80 (an example of first biasing member) configured to bias the engaging member 76 upward, and the compression spring 82 (an example of second biasing member) spaced apart from the compression spring 80 in the left-right direction and configured to bias the engaging member 76 upward. At least a part of the control circuit board 32 is arranged between the compression spring 80 and the compression spring 82. The engaging member 76 comprises the engaging portion 76*b* protruding to the outside of the casing 20. The engaging portion 76*b* includes the right engaging surface 76*o* and the left engaging surface 76*q* (an example of engaging surface) that extend in the up-down direction and the left-right direction and are configured to engage with the electrical device 4. In the front-rear direction, the right engaging surface 76*o* and the left engaging surface 76*q* are arranged rearward of a front end of the compression spring 80 and forward of a rear end of the compression spring 82. In the front-rear direction, the right engaging surface 76*o* and the left engaging surface 76*q* are arranged rearward of a front end of the compression spring 82 and forward of a rear end of the compression spring 82.

According to the configuration above, the compression spring 80 and the compression spring 82, which are spaced apart from each other in the left-right direction, bias the engaging member 76 upward, and thus the biasing force applied to the engaging member 76 can be balanced in the left-right direction and the engaging member 76 is suppressed from tilting with respect to the casing 20 in the left-right direction. Further, according to the configuration above, a position in the front-rear direction of the point of application of the biasing force applied to the engaging member 76 can be set close to a position of the engaging portion 76*b* in the front-rear direction. Thus, even when dust enters a gap between the engaging member 76 and the casing and the engaging portion 76*b* is caught on the casing 20, the biasing force of the compression spring 80 and the compression spring 82 can be applied to the engaging member 76 to release the engaging portion from being caught. Further, according to the configuration above, at least a part of the control circuit board 32 is arranged between the compression spring 80 and the compression spring 82, and thus a space between the compression spring 80 and the compression spring 82 can be efficiently utilized.

In one or more embodiments, in the left-right direction, a right end of the compression spring 80 is arranged rightward of a right end of the right engaging surface 76*o*. In the left-right direction, a left end of the compression spring 82 is arranged leftward of a left end of the left engaging surface 76*q*.

According to the configuration above, a wide interval is ensured between the compression spring 80 and the compression spring 82, and thus a wide space for mounting elements and wires on the control circuit board 32 can be ensured. Further, since the wide interval is ensured between the compression spring 80 and the compression spring 82, the biasing force applied to the engaging member 76 can be easily balanced in the left-right direction and the engaging member 76 can be efficiently suppressed from tilting with respect to the casing in the left-right direction.

In one or more embodiments, in the left-right direction, a left end of the compression spring 80 is arranged rightward of the right end of the right engaging surface 76*o*. In the left-right direction, a right end of the compression spring 82 is arranged leftward of the left end of the left engaging surface 76*q*.

According to the configuration above, a wide interval is ensured between the compression spring 80 and the compression spring 82, and thus a wide space for mounting elements and wires on the control circuit board 32 can be ensured. Further, since the wide interval is ensured between the compression spring 80 and the compression spring 82, the biasing force applied to the engaging member 76 can be easily balanced in the left-right direction and the engaging member 76 can be efficiently suppressed from tilting with respect to the casing in the left-right direction.

In one or more embodiments, the battery pack-mount part 6 comprises the device-side terminal 8. The control circuit board 32 comprises the battery-side terminal 36 configured to mechanically engage with and electrically connect to the device-side terminal 8. In the left-right direction, a right end of the compression spring 80 is arranged rightward of a right end of the battery-side terminal 36. In the left-right direction, a left end of the compression spring 82 is arranged leftward of a left end of the battery-side terminal 36.

According to the configuration above, a wide interval is ensured between the compression spring 80 and the compression spring 82, and thus a wide space for mounting elements and wires on the control circuit board 32 can be ensured. Further, since the wide interval is ensured between the compression spring 80 and the compression spring 82, the biasing force applied to the engaging member 76 can be easily balanced in the left-right direction and the engaging member 76 can be efficiently suppressed from tilting with respect to the casing in the left-right direction.

In one or more embodiments, in the left-right direction, a left end of the compression spring 80 is arranged rightward of the right end of the battery-side terminal 36. In the left-right direction, a right end of the compression spring 82 is arranged leftward of the left end of the battery-side terminal 36.

According to the configuration above, a wide interval is ensured between the compression spring 80 and the compression spring 82, and thus a wide space for mounting elements and wires on the control circuit board 32 can be ensured. Further, since the wide interval is ensured between the compression spring 80 and the compression spring 82, the biasing force applied to the engaging member 76 can be easily balanced in the left-right direction and the engaging member 76 can be efficiently suppressed from tilting with respect to the casing 20 in the left-right direction.

In one or more embodiments, the control circuit board 32 comprises the conductive member 44 (an example of power path) along which a current discharged to and/or charged from the electrical device 4 flows. The conductive member 44 passes between the compression spring 80 and the compression spring 82.

According to the configuration above, the conductive member 44 passes between the compression spring 80 and the compression spring 82, and thus the other portions of the control circuit board 32 can be efficiently utilized as spaces for mounting other elements and wires.

In one or more embodiments, the control circuit board 32 comprises the microcontroller 50 configured to control an operation of the battery pack 2. The microcontroller 50 is arranged between the compression spring 80 and the compression spring 82.

According to the configuration above, the microcontroller 50 is arranged between the compression spring 80 and the compression spring 82, and thus the other portions of the control circuit board 32 can be efficiently utilized as spaces for mounting other elements and wires.

In one or more embodiments, the battery pack 2 further comprises the manipulatable member 78 pivotably held by the casing 20 and including the manipulatable surface 78*d* configured to be manipulated by a user. When the user presses the manipulatable surface 78*d*, the manipulatable member 78 pivots in a direction that causes the engaging member 76 to be pushed downward.

According to the configuration above, the engaging member 76 is less likely to tilt with respect to the casing 20 when moving in the up-down direction with respect to the casing 20, as compared to a configuration in which the engaging member 76 is integrated with the manipulatable member 78, and thus the engaging member 76 is less likely to be caught on the casing 20.

In one or more embodiments, the manipulatable surface 78*d* is arranged on a front upper surface of the casing 20.

According to the configuration above, when the user detaches the battery pack 2 from the battery pack-mount part 6, the user can place his/her four fingers of one hand, other than the thumb, on a lower surface of the battery pack 2 and push down the manipulatable surface 78*d* with the thumb to slide the battery pack 2 forward while keeping the manipulatable surface 78*d* pushed down and holding the battery pack 2. This simplifies the user's manipulation of detaching the battery pack 2.

In one or more embodiments, the manipulatable member 78 is held by the casing 20 so as to be pivotable about a pivot axis extending in the left-right direction.

According to the configuration above, the manipulatable surface 78*d* can be suppressed from tilting in the left-right direction when the user pushes down the manipulatable surface 78*d*.

In one or more embodiments, the engaging member 76 comprises the right beam 76*j* and the left beam 76*k* (an example of portion to be abutted). The manipulatable member 78 comprises the right abutment piece 78*f* and the left abutment piece 78*g* (an example of abutment portion) arranged above the right beam 76*j* and the left beam 76*k*. In the front-rear direction, a position where the right abutment piece 78*f* and the left abutment piece 78*g* abut the right beam 76*j* and the left beam 76*k* is rearward of the front end of the compression spring 80 and forward of the rear end of the compression spring 80. In the front-rear direction, the position where the right abutment piece 78*f* and the left abutment piece 78*g* abut the right beam 76*j* and the left beam 76*k* is rearward of the front end of the compression spring 82 and forward of the rear end of the compression spring 82.

According to the configuration above, a position of the point of application of the downward force applied from the manipulatable member 78 to the engaging member 76 in the front-rear direction can be close to a position of the point of application of the upward force applied from the compression spring 80 and the compression spring 82 to the engaging member 76 in the front-rear direction. This can suppress the engaging member 76 from tilting in the front-rear direction.

In one or more embodiments, the right beam 76*j* and the left beam 76*k* (an example of rod-shaped portion) include a rod-like shape extending in the left-right direction. The right abutment piece 78*f* and the left abutment piece 78*g* (an example of abutment piece) are arranged above the right beam 76*j* and the left beam 76*k*.

According to the configuration above, the configurations of the manipulatable member 78 and the engaging member 76 can be simplified.

In one or more embodiments, the casing 20 further comprises the right guide portion 92 and the left guide portion 94 (an example of guide portion) configured to prohibit movement of the engaging member 76 in the front-rear direction and to permit movement of the engaging member 76 in the up-down direction. In the front-rear direction, the compression spring 80 is arranged rearward of front ends of the right guide portion 92 and the left guide portion 94 and forward of rear ends of the right guide portion 92 and the left guide portion 94. In the front-rear direction, the compression spring 82 is arranged rearward of the front ends of the right guide portion 92 and the left guide portion 94 and forward of the rear ends of the right guide portion 92 and the left guide portion 94.

According to the configuration above, a position of the point of application of the biasing force applied from the compression spring 80 and the compression spring 82 to the engaging member 76 in the front-rear direction can be close to a position of the right guide portion 92 and the left guide portion 94 in the front-rear direction. This can suppress the engaging member 76 from tilting in the front-rear direction.

In one or more embodiments, the battery pack 2 is configured to be detachably attached to the battery pack-mount part 6 of the electrical device 4 by being slid with respect to the battery pack-mount part 6. The front direction is defined as a direction in which the battery pack 2 is slid when the battery pack 2 is detached from the battery pack-mount part 6, the rear direction is defined as a direction in which the battery pack 2 is slid when the battery pack 2 is attached to the battery pack-mount part 6, the up direction is defined as a direction in which the battery pack-mount part 6 is positioned as viewed from the battery pack 2 in the state where the battery pack 2 is attached to the battery pack-mount part 6, and the down direction is defined as the direction opposite to the up direction. The battery pack 2 comprises the casing 20, the battery cells 28 housed inside the casing 20, the engaging member 76 held by the casing 20 so as to be movable in an up-down direction, the compression spring 80 (an example of first biasing member) configured to bias the engaging member 76 upward, and the compression spring 82 (an example of second biasing member) spaced apart from the compression spring 80 in the left-right direction and configured to bias the engaging member 76 upward. The engaging member 76 comprises the engaging portion 76*b* protruding to the outside of the casing 20. The engaging portion 76*b* includes the right engaging surface 76*o* and the left engaging surface 76*q* (an example of engaging surface) that extend in the up-down direction and the left-right direction and are configured to engage with the electrical device 4. In the front-rear direction, the right engaging surface 76*o* and the left engaging surface 76*q* are arranged rearward of a front end of the compression spring 80 and forward of a rear end of the compression spring 82. In the front-rear direction, the right engaging surface 76*o* and the left engaging surface 76*q* are arranged rearward of a front end of the compression spring 82 and forward of a rear end of the compression spring 82. In the left-right direction, a right end of the compression spring 80 is arranged rightward of a right end of the right engaging surface 76*o*. In the left-right direction, a left end of the compression spring 82 is arranged leftward of a left end of the left engaging surface 76*q*.

According to the configuration above, the compression spring 80 and the compression spring 82, which are spaced apart from each other in the left-right direction, bias the engaging member 76 upward, and thus the biasing force applied to the engaging member 76 can be balanced in the left-right direction and the engaging member 76 is suppressed from tilting with respect to the casing 20 in the left-right direction. Further, according to the configuration above, a position of the point of application of the biasing force applied to the engaging member 76 in the front-rear direction can be close to a position of the engaging portion 76*b* in the front-rear direction. Thus, even when dust enters a gap between the engaging member 76 and the casing 20 and the engaging portion 76*b* is caught on the casing 20, the biasing force of the compression spring 80 and the compression spring 82 can be applied to the engaging member 76 to release the engaging member 76 from being caught. Further, according to the configuration above, a wide interval is ensured between the compression spring 80 and the compression spring 82, and thus the biasing force applied to the engaging member 76 can be easily balanced in the left-right direction and the engaging member 76 can be efficiently suppressed from tilting with respect to the casing 20 in the left-right direction.

In one or more embodiments, the battery pack 2 is configured to be detachably attached to the battery pack-mount part 6 of the electrical device 4 including the device-side terminal 8 by being slid with respect to the battery pack-mount part 6. The front direction is defined as a direction in which the battery pack 2 is slid when the battery pack 2 is detached from the battery pack-mount part 6, the rear direction is defined as a direction in which the battery pack 2 is slid when the battery pack 2 is attached to the battery pack-mount part 6, the up direction is defined as a direction in which the battery pack-mount part 6 is positioned as viewed from the battery pack 2 in the state where the battery pack 2 is attached to the battery pack-mount part 6, and the down direction is defined as the direction opposite to the up direction. The battery pack 2 comprises the casing 20, the battery cells 28 housed inside the casing 20, the battery-side terminal 36 configured to mechanically engage with and electrically connect to the device-side terminal 8, the engaging member 76 held by the casing 20 so as to be movable in the up-down direction, the compression spring 80 (an example of first biasing member) configured to bias the engaging member 76 upward, and the compression spring 82 (an example of second biasing member) spaced apart from the compression spring 80 in a left-right direction and configured to bias the engaging member 76 upward. The engaging member 76 comprises the engaging portion **76*b* protruding to the outside of the casing 20. The engaging portion 76*b* includes the right engaging surface 76*o* and the left engaging surface 76*q* (an example of engaging surface) that extend in the up-down direction and the left-right direction and are configured to engage with the electrical device 4. In the front-rear direction, the right engaging surface 76*o* and the left engaging surface 76*q* are arranged rearward of a front end of the compression spring 80 and forward of a rear end of the compression spring 82. In the front-rear direction, the right engaging surface 76*o* and the left engaging surface 76*q* are arranged rearward of a front end of the compression spring 82 and forward of a rear end of the compression spring 82. In the left-right direction, a right end of the compression spring 80 is arranged rightward of a right end of the battery-side terminal 36. In the left-right direction, a left end of the compression spring 82 is arranged leftward of a left end of the battery-side terminal 36**.

According to the configuration above, the compression spring 80 and the compression spring 82, which are spaced apart from each other in the left-right direction, bias the engaging member 76 upward, and thus the biasing force applied to the engaging member 76 can be balanced in the left-right direction and the engaging member 76 is suppressed from tilting with respect to the casing 20 in the left-right direction. Further, according to the configuration above, a position of the point of application of the biasing force applied to the engaging member 76 in the front-rear direction can be close to a position of the engaging portion **76*b* in the front-rear direction. Thus, even when dust enters a gap between the engaging member 76 and the casing 20 and the engaging portion 76*b* is caught on the casing 20, the biasing force of the compression spring 80 and the compression spring 82 can be applied to the engaging member 76 to release the engaging member 76 from being caught. Further, according to the configuration above, a wide interval is ensured between the compression spring 80 and the compression spring 82, and thus the biasing force applied to the engaging member 76 can be easily balanced in the left-right direction and the engaging member 76 can be efficiently suppressed from tilting with respect to the casing 20** in the left-right direction.

In one or more embodiments, the battery pack 2 is configured to be detachably attached to the battery pack-mount part 6 of the electrical device 4 by being slid with respect to the battery pack-mount part 6. The battery pack 2 comprises the casing 20, the engaging member 76 including the engaging portion **76*b* protruding to the outside of the casing 20, and the manipulatable member 78 including the manipulatable surface 78*d* exposed to the outside of the casing 20. The engaging portion 76*b* is configured to move toward the inside of the casing 20 when the manipulatable surface 78*d* is pressed. The anti-slip portion 78*i* that is formed of regularly arranged convex lines 78*h* (an example of convex shapes and/or concave shapes) is formed on the manipulatable surface 78*d*. The anti-slip portion 78*i* is arranged, on the manipulatable surface 78*d*, on the side closer to the engaging portion 76*b***.

According to the configuration above, when the user detaches the battery pack 2 from the battery pack-mount part 6, the user can be prompted to place his/her fingertip on the anti-slip portion **78*i*, which is arranged on the side closer to the engaging portion 76*b* on the manipulatable surface 78*d*, to press the manipulatable surface 78*d*. This allows a pressing force generated by the pressing of the manipulatable surface 78*d* by the user to be applied to a position close to the engaging portion 76*b*, and thus the engaging member 76 can be smoothly moved with respect to the casing 20**.

In one or more embodiments, the anti-slip portion **78*i* is formed of the plurality of convex lines 78*h* extending in a direction substantially orthogonal to the direction in which the battery pack 2 is slid when the battery pack 2 is detached from the battery pack-mount part 6** (e.g., the front-rear direction).

According to the configuration above, when the user presses the manipulatable surface **78*d* with his/her fingertip placed on the anti-slip portion 78*i* to detach the battery pack 2 from the battery pack-mount part 6, the fingertip is efficiently suppressed from slipping from the anti-slip portion 78*i***.

Second Embodiment

Figure 22:
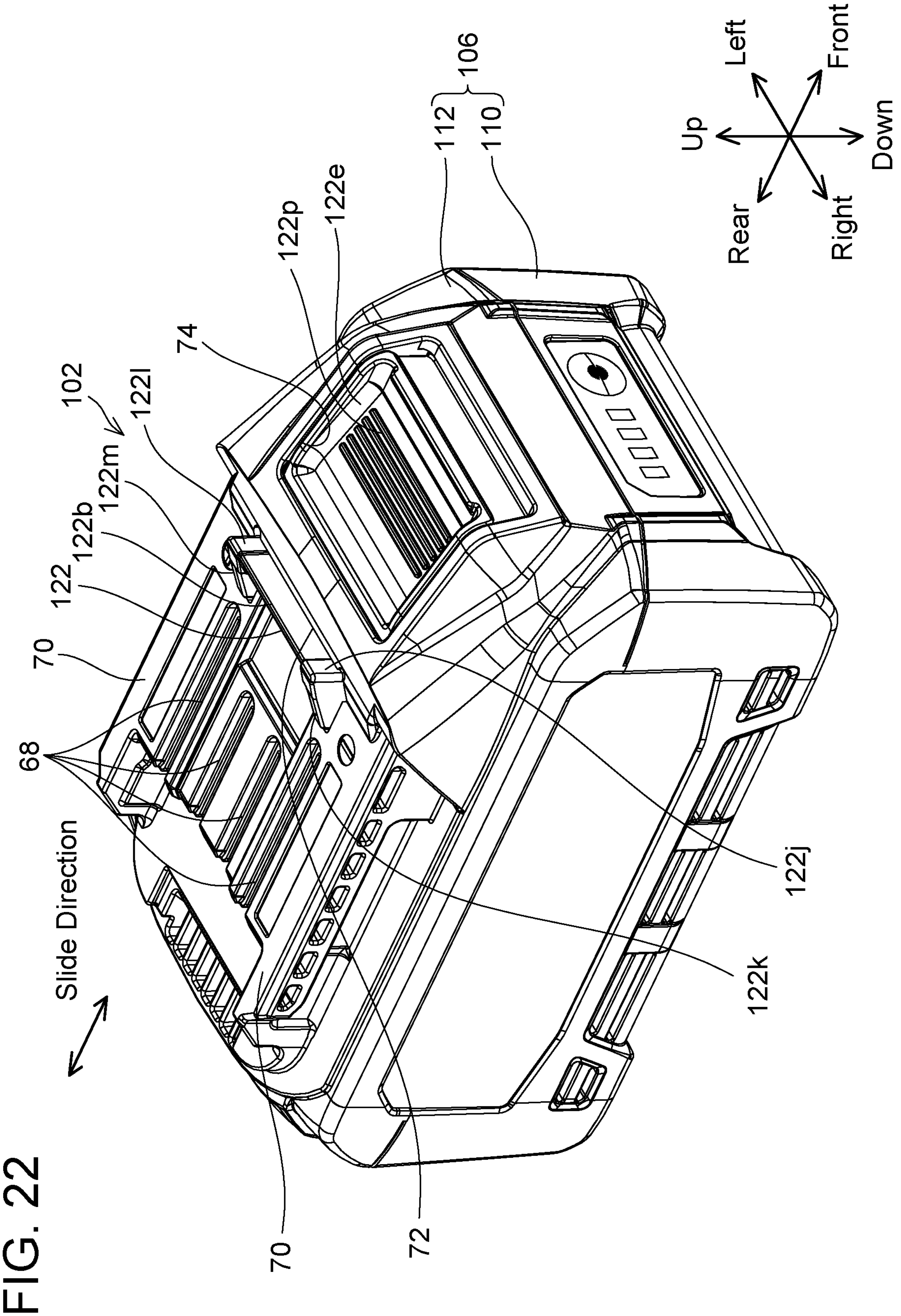
FIG. 22 is a perspective view of a battery pack 102 according to a second embodiment, as viewed from the upper front right side.

As with the battery pack 2 according to the first embodiment, a battery pack 102 according to the present embodiment, illustrated in FIG. 22, is attached to an electrical device 4 (see FIGS. 2, 3) for use. The battery pack 102 is attachable to a battery pack-mount part 6 by being slid in a predetermined slide direction with respect to the battery pack-mount part 6 of the electrical device 4. Hereinafter, a direction in which the battery pack 102 is slid when the battery pack 102 is attached to the battery pack-mount part 6 will be termed a rear direction, and a direction in which the battery pack 102 is slid when the battery pack 102 is detached from the battery pack-mount part 6 will be termed a front direction. Further, a direction in which the battery pack-mount part 6 is position as viewed from the battery pack 102 in the state where the battery pack 102 is attached to the battery pack-mount part 6 will be termed an up direction, and the direction opposite to the up direction will be termed a down direction. Further, a direction orthogonal to the front-rear direction and the up-down direction will be termed a left-right direction. It should be noted that in the following description, configurations same as those of the battery pack 2 according to the first embodiment will be labeled with the same reference signs and detailed description thereof will be omitted. The rated voltage of the battery pack 102 is, for example, 36 V. The rated capacity of the battery pack 102 is, for example, 4.0 Ah. The weight of the battery pack 102 is equal to or less than 1.0 kg, for example, 1.0 kg.

The battery pack 102 comprises a casing 106 and a battery cell unit 108 (see FIG. 23) housed inside the casing 106. The casing 106 comprises a lower casing 110 and an upper casing 112. The lower casing 110 and the upper casing 112 are secured to each other with four bolts (not illustrated).

Figure 23:
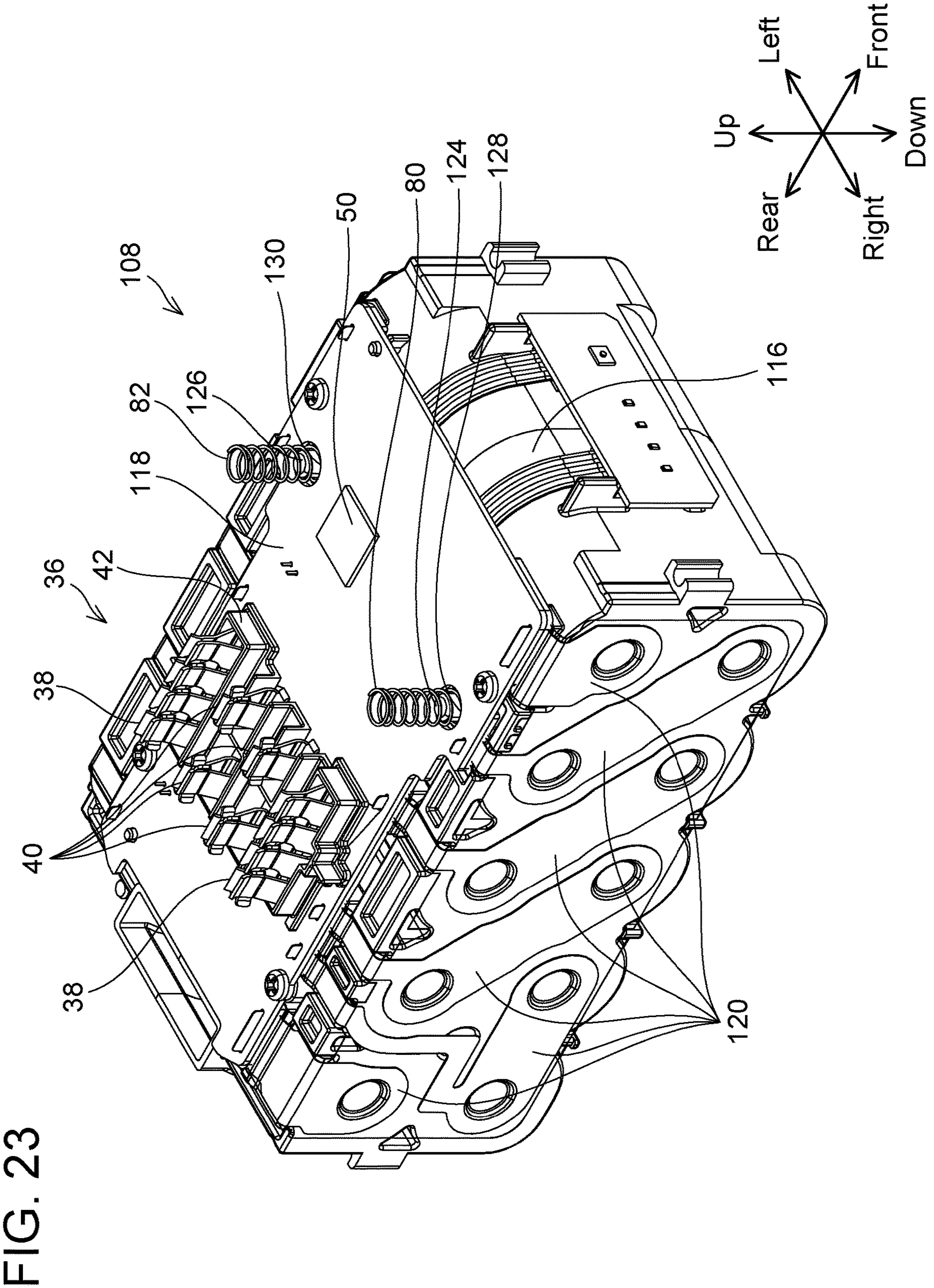
FIG. 23 is a perspective view of a battery cell unit 108 of the battery pack 102 according to the second embodiment, as viewed from the upper front right side.

As illustrated in FIG. 23, the battery cell unit 108 comprises battery cells 114 (see FIG. 24), a cell holder 116 made of resin and holding the battery cells 114, a control circuit board 118 held by the cell holder 116 above the cell holder 116, lead plates 120 arranged on left and right surfaces of the cell holder 116 and electrically connecting the battery cells 114 to the control circuit board 118, and battery-side terminals 36 arranged on an upper surface of the control circuit board 118.

Figure 24:
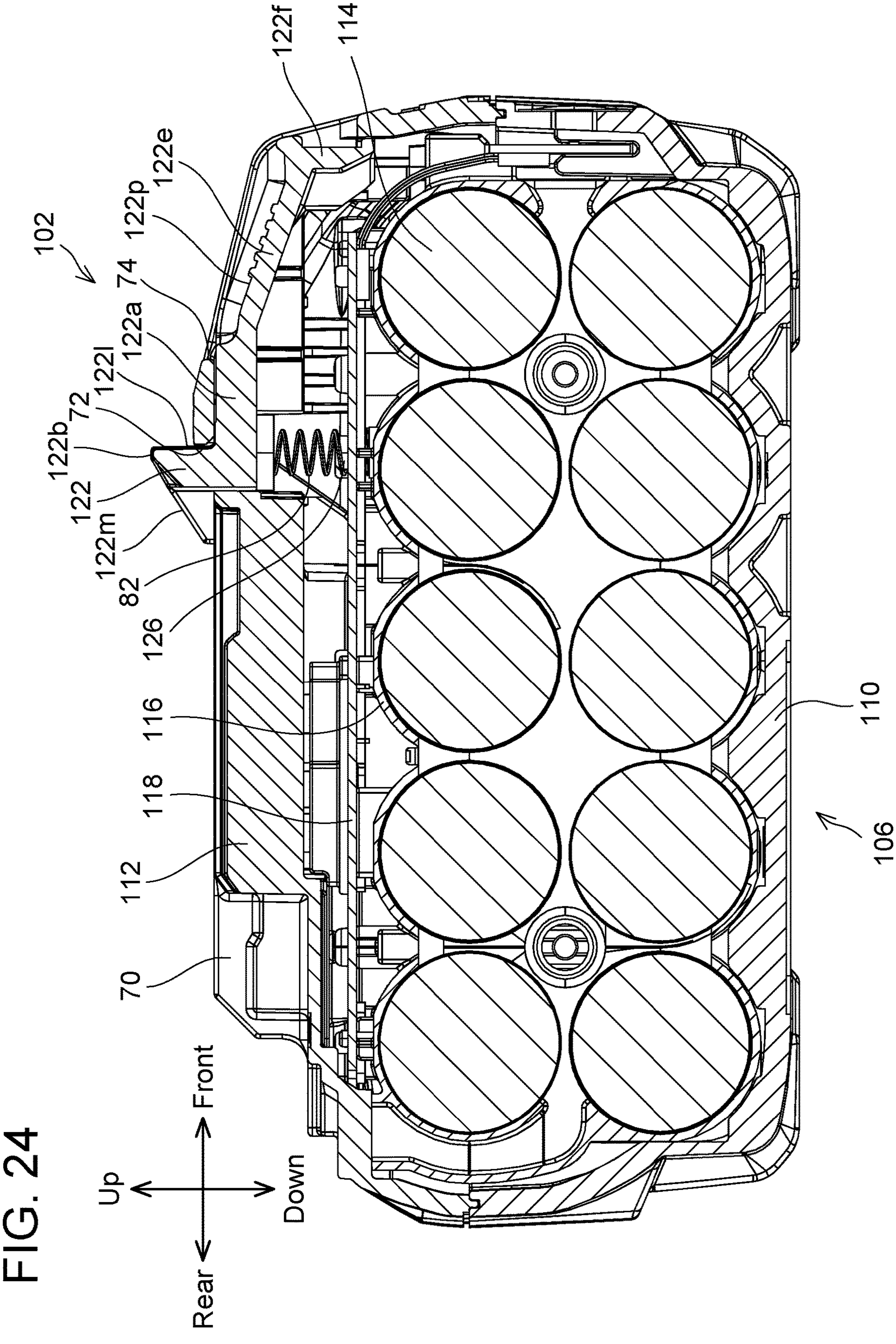
FIG. 24 is a longitudinal cross-sectional view of the battery pack 102 according to the second embodiment.

As illustrated in FIG. 24, the battery cells 114 are arranged in two layers in the up-down direction. Each battery cell 114 is, for example, a lithium-ion battery cell. Each battery cell 114 is substantially cylindrical and arranged such that its longitudinal direction is along the left-right direction. The shape of each battery cell 114 is according to, for example, standard 21700, having a diameter of 21 mm and a longitudinal dimension of 70 mm. In the lower layer, five battery cells 114 are arranged in the front-rear direction. The battery cells 114 in the lower layer are arranged to be positioned substantially at the same position in the up-down direction. In the upper layer, five battery cells 114 are arranged in the front-rear direction. In the front-rear direction, positions of the centers of the battery cells 114 in the upper layer are substantially coincident with positions of the centers of the battery cells 114 in the lower layer. The battery cells 114 in the upper layer are arranged to be positioned substantially at the same position in the up-down direction.

Figure 25:
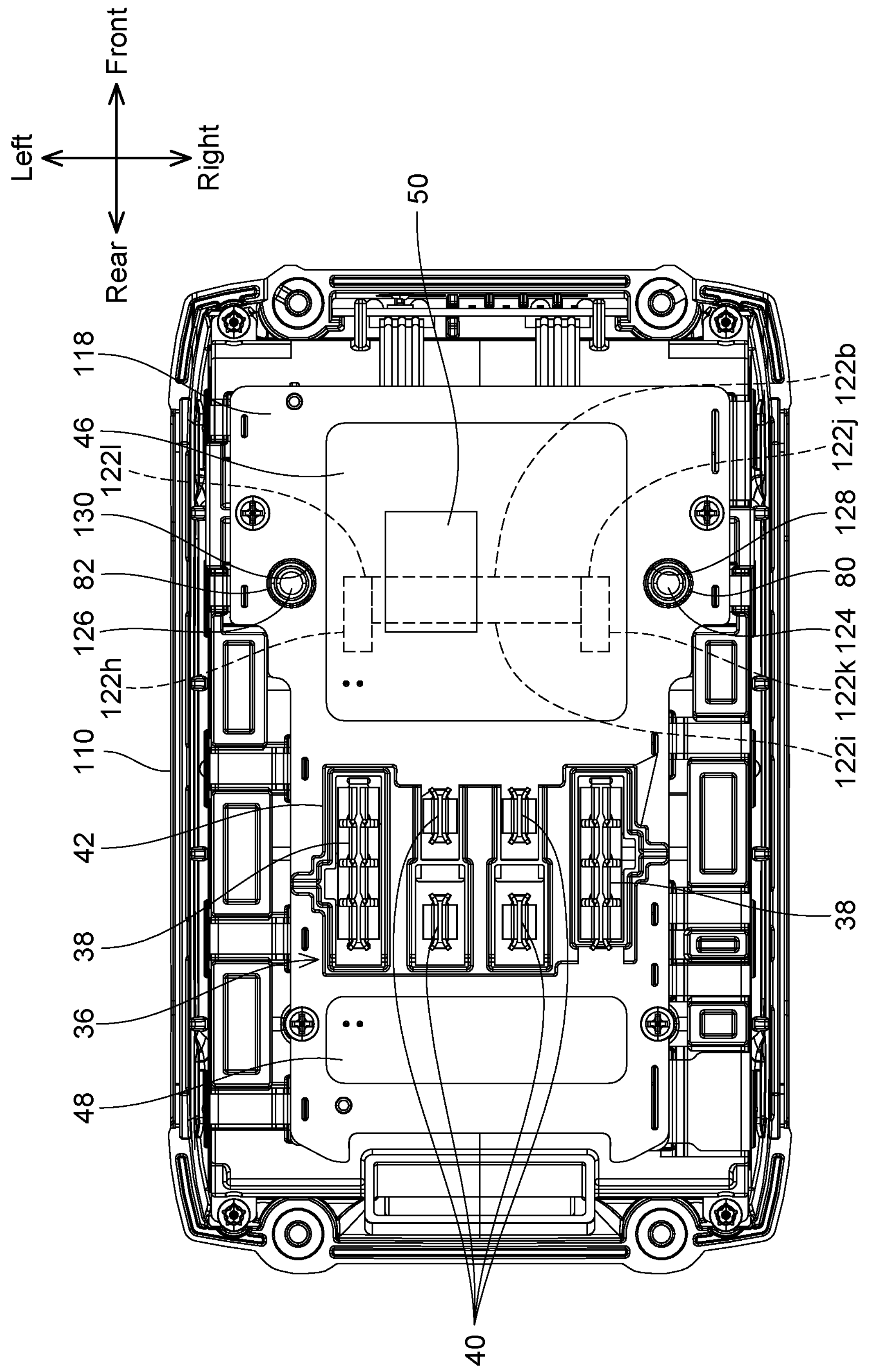
FIG. 25 is a top view of the battery cell unit 108 and a lower casing 110 of the battery pack 102 according to the second embodiment.

As illustrated in FIG. 23, a bracket 42 is arranged on the upper surface of the control circuit board 118 in order to suppress short circuit between the battery-side terminals 36. As illustrated in FIG. 25, the upper surface of the control circuit board 118 includes circuit element regions 46, 48. A microcontroller 50 is mounted on the circuit element region 46.

As illustrated in FIG. 22, terminal openings 68, battery-side rails 70, an engagement opening 72, and a manipulation opening 74 are formed in an upper surface of the upper casing 112. An engaging member 122 is attached to the engagement opening 72 and the manipulation opening 74.

Figure 26:
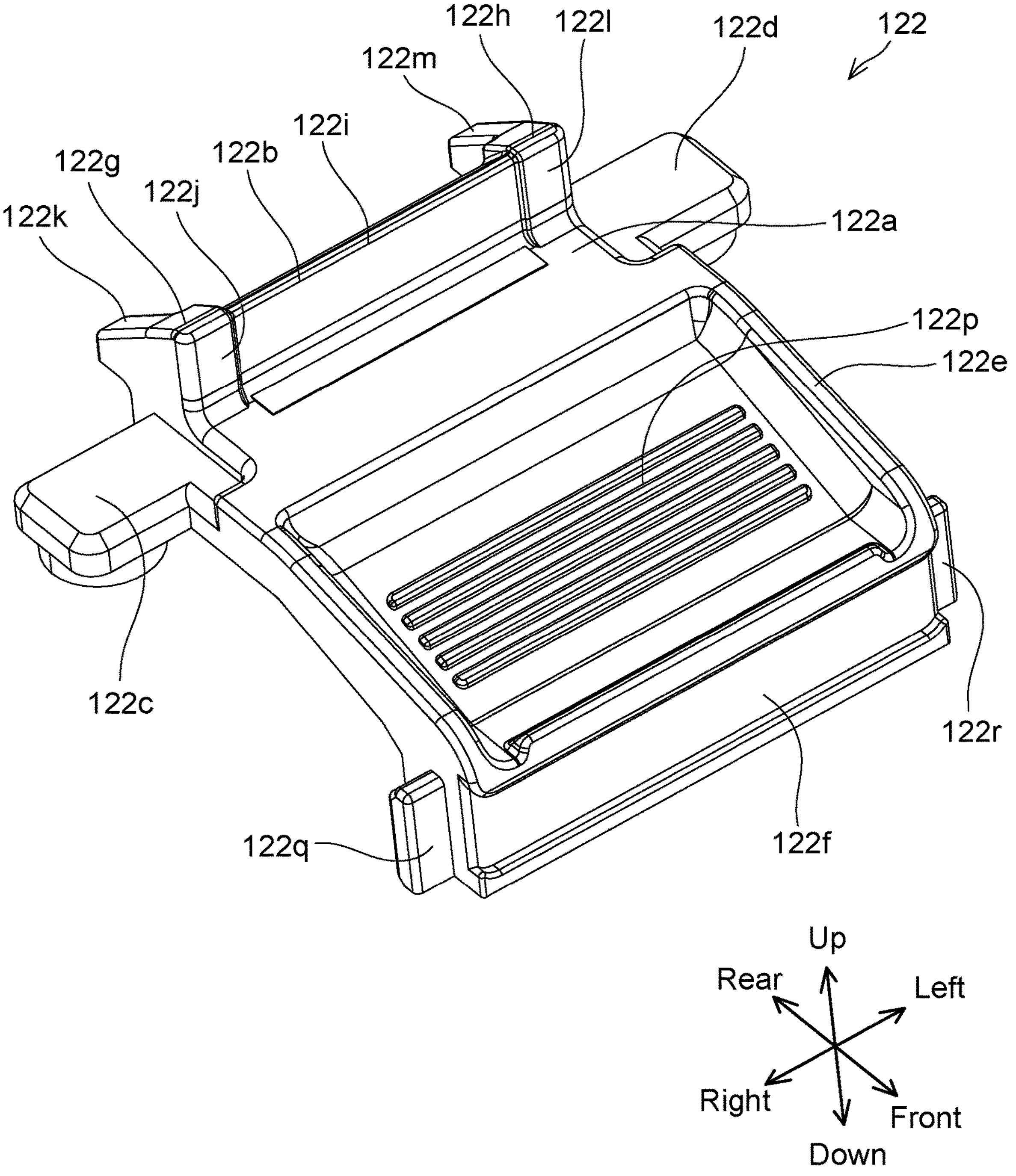
FIG. 26 is a perspective view of an engaging member 122 of the battery pack 102 according to the second embodiment, as viewed from the upper front right side.
Figure 27:
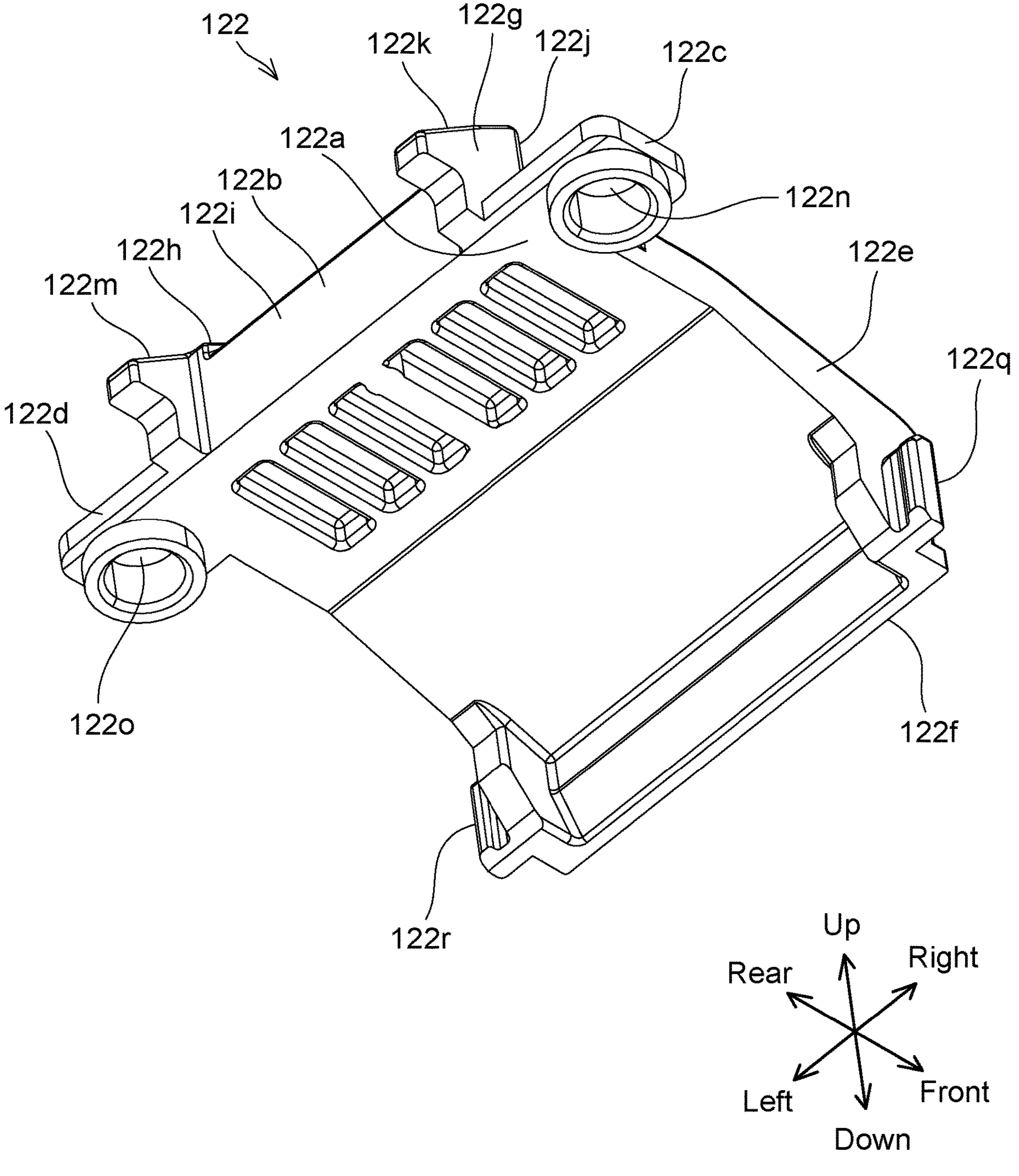
FIG. 27 is a perspective view of the engaging member 122 of the battery pack 102 according to the second embodiment, as viewed from the lower rear right side.

As illustrated in FIG. 26, the engaging member 122 comprises a base portion 122*a*, an engaging portion 122*b* protruding upward from a rear portion of the base portion 122*a*, a right supporting portion 122*c* arranged rightward of the base portion 122*a*, a left supporting portion 122*d* arranged leftward of the base portion 122*a*, a manipulatable portion 122*e* extending forward and downward from the base portion 122*a*, and a supporting portion 122*f* extending downward from near a front end of the manipulatable portion 122*e*. The engaging portion 122*b* comprises a right engaging portion 122*g* arranged at a right end of the engaging portion 122*b*, a left engaging portion 122*h* arranged at a left end of the engaging portion 122*b*, and a connecting portion 122*i* connecting the right engaging portion 122*g* and the left engaging portion 122*h*. The right engaging portion 122*g* comprises a right engaging surface 122*j* arranged along the left-right direction and the up-don direction and facing forward; and a right inclined surface 122*k* arranged rearward of the right engaging surface 122*j* to face rearward and upward and inclined downward from above as it extends from the front to rear. The left engaging portion 122*h* comprises a left engaging surface 122*l* arranged along the left-right direction and the up-down direction and facing forward; and a left inclined surface 122*m* arranged rearward of the left engaging surface 122*l* to face rearward and upward and inclined downward from above as it extends from the front to rear. As illustrated in FIG. 27, the right supporting portion 122*c* comprises a spring receiving groove 122*n* that is open downward and has a substantially cylindrical shape. A compression spring 80 (see FIG. 23) is attached to the spring receiving groove 122*n*. The left supporting portion 122*d* comprises a spring receiving groove 122*o* that is open downward and has a substantially cylindrical shape. A compression spring 82 (see FIG. 23) is attached to the spring receiving groove 122*o*. As illustrated in FIG. 26, the manipulatable portion 122*e* comprises a manipulatable surface 122*p* that is subjected to a user's pressing manipulation. The supporting portion 122*f* comprises a right guide protrusion 122*q* protruding rightward from a right end of the supporting portion 122*f* and extending in the up-down direction; and a left guide protrusion 122*r* protruding leftward from a left end of the supporting portion 122*f* and extending in the up-down direction.

As illustrated in FIG. 23, a spring supporting portion 124 supporting the compression spring 80 and a spring supporting portion 126 supporting the compression spring 82 are formed on an upper portion of the cell holder 116. The control circuit board 118 comprises a through hole 128 arranged near a right end of the control circuit board 118 and a through hole 130 arranged near a left end of the control circuit board 118. The spring supporting portion 124 extends through the through hole 128 and protrudes upward. The spring supporting portion 126 extends through the through hole 130 and protrudes upward. The compression springs 80, 82 bias the engaging member 122 upward with respect to the cell holder 116.

Figure 28:
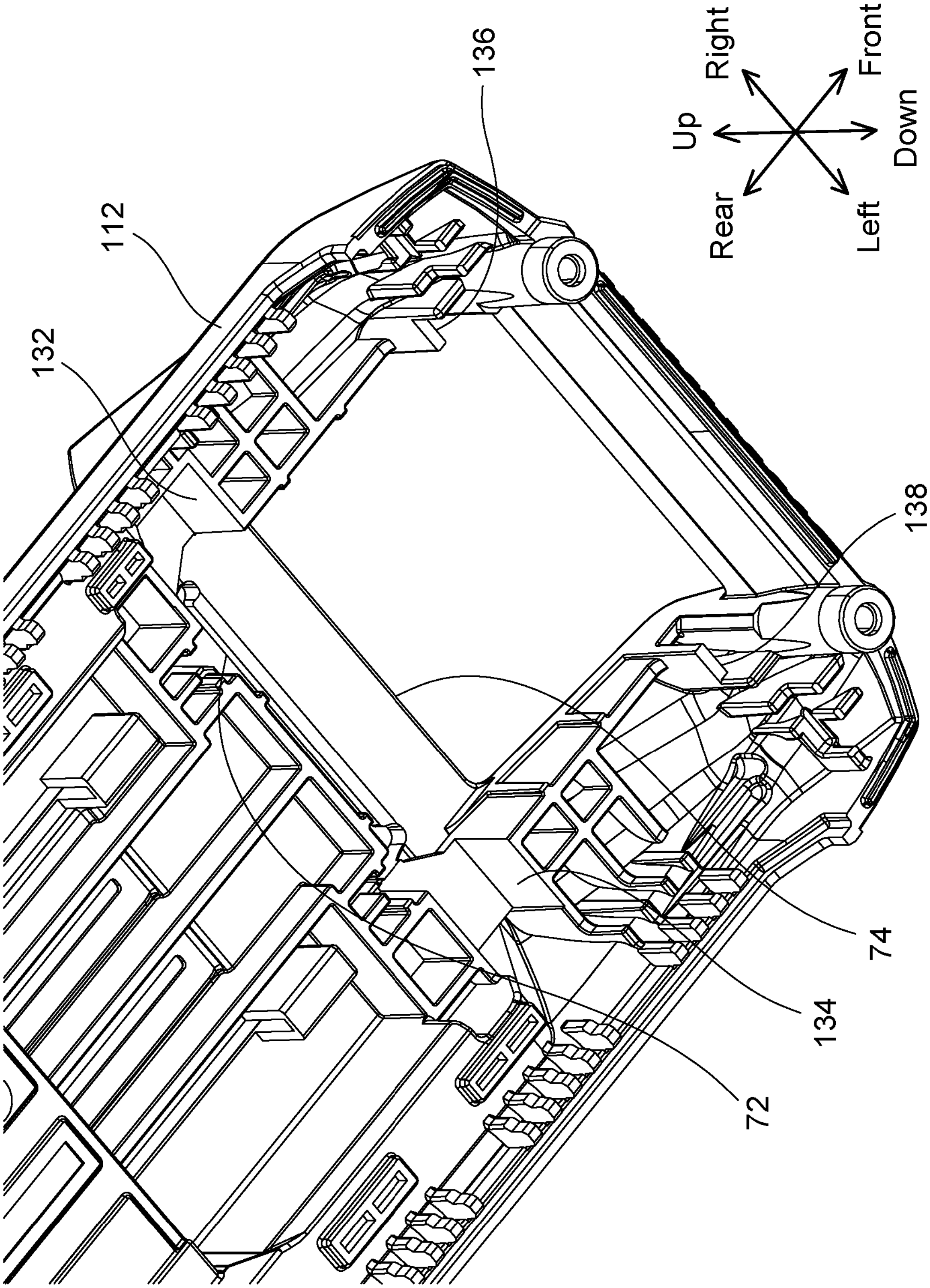
FIG. 28 is a perspective view of a front portion of an upper casing 112 of the battery pack 102 according to the second embodiment, as viewed from the lower rear right side.
Figure 29:
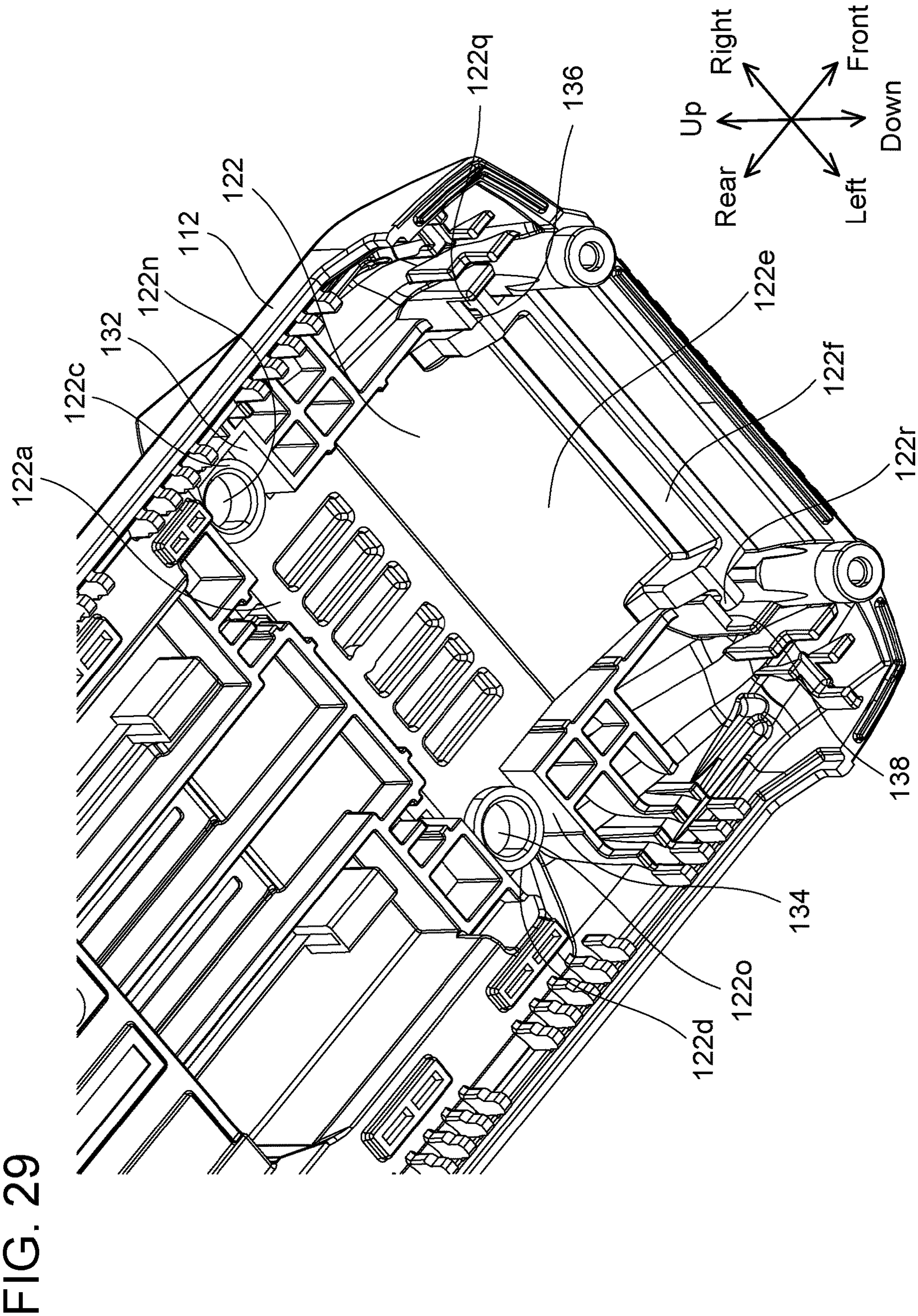
FIG. 29 is a perspective view of the front portion of the upper casing 112 in the state where the engaging member 122 is attached to the upper casing 112 in the battery pack 102 according to the second embodiment, as viewed from the lower rear right side.

As illustrated in FIG. 28, a right guide portion 132 and a left guide portion 134 are formed on an inner surface of the upper casing 112 near the engagement opening 72. The right guide portion 132 receives the right supporting portion 122*c* of the engaging member 122 such that it is movable in the up-down direction but immovable in the front-rear direction and the right direction. The left guide portion 134 receives the left supporting portion 122*d* of the engaging member 122 such that it is movable in the up-down direction but immovable in the front-rear direction and in the left direction. Further, a right front guide portion 136 and a left front guide portion 138 are formed on the inner surface of the upper casing 112 near a front end thereof. The right front guide portion 136 holds the right guide protrusion 122*q* of the engaging member 122 such that it is movable in the up-down direction but immovable in the front-rear direction and the right direction. The left front guide portion 138 holds the left guide protrusion 122*r* of the engaging member 122 such that it is movable in the up-down direction but immovable in the front-rear direction and the left direction. As illustrated in FIG. 29, the engaging member 122 is attached to the upper casing 112 such that the engaging portion 122*b* protrudes to the outside of the upper casing 112 from the engagement opening 72, the manipulatable surface 122*p* of the manipulatable portion 122*e* is exposed to the outside of the upper casing 112 via the manipulation opening 74, the right supporting portion 122*c* is received in the right guide portion 132, the left supporting portion 122*d* is received in the left guide portion 134, the right guide protrusion 122*q* is held by the right front guide portion 136, and the left guide protrusion 122*r* is held by the left front guide portion 138.

Figure 30:
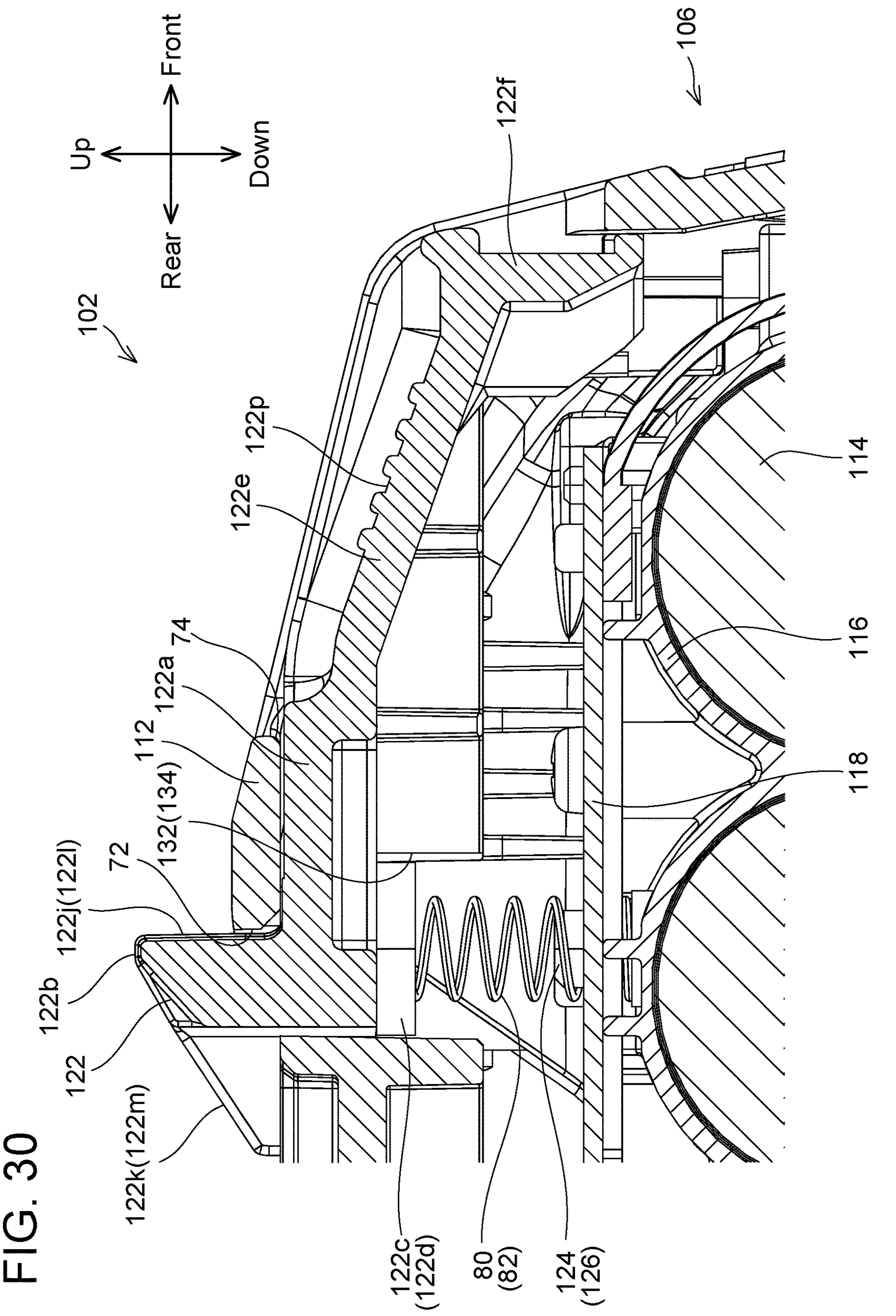
FIG. 30 is a longitudinal cross-sectional view of the battery pack 102 according to the second embodiment in the vicinity of the engaging member 122.

As illustrated in FIG. 30, in the state where the engaging member 122 is attached to the upper casing 112, the engaging member 122 is pressed against the upper casing 112 by the compression springs 80, 82 biasing the engaging member 122 upward with respect to the cell holder 116.

When the battery pack 102 is attached to the electrical device 4, a housing 18 (see FIG. 3) of the electrical device 4 abuts the right inclined surface 122*k* and the left inclined surface 122*m* of the engaging member 122 and moves from the rear to front, as a result of which the engaging member 122 is pushed downward against the biasing force of the compression springs 82. Then, once an engaging groove 12

(see FIG. 3) of the electrical device 4 moves to above the engaging portion 122*b* of the engaging member 122, the engaging member 122 is pushed upward by the biasing force of the compression springs 80, 82, and the engaging portion 122*b* enters the engaging groove 12. In this state, the right engaging surface 122*j* and the left engaging surface 122*l* of the engaging member 122 are arranged to face an engaging surface 12*a* (see FIG. 3) of the electrical device 4, and thus the battery pack 102 is prohibited to slide forward with respect to the electrical device 4. Thus, detachment of the battery pack 102 from the electrical device 4 is prohibited.

When detaching the battery pack 102 from the electrical device 4, the user performs a pressing manipulation on the manipulatable surface 122*p* of the engaging member 122. By this manipulation, the engaging member 122 is pushed downward against the biasing force of the compression springs 80, 82. As a result, the engaging portion 122*b* of the engaging member 122 exits from the engaging groove 12 of the electrical device 4, and thus the battery pack 102 is prohibited to slide forward with respect to the electrical device 4. By sliding the battery pack 102 forward with respect to the electrical device 4 in this state, the user can detach the battery pack 102 from the electrical device 4.

As described above, in one or more embodiments, the battery pack 102 is configured to be detachably attached to the battery pack-mount part 6 of the electrical device 4 by being slid with respect to the battery pack-mount part 6. The front direction is defined as a direction in which the battery pack 102 is slid when the battery pack 102 is detached from the battery pack-mount part 6, the rear direction is defined as a direction in which the battery pack 102 is slid when the battery pack 102 is attached to the battery pack-mount part 6, the up direction is defined as a direction in which the battery pack-mount part 6 is positioned as viewed from the battery pack 102 in the state where the battery pack 102 is attached to the battery pack-mount part 6, and the down direction is defined as a direction opposite to the up direction. The battery pack 102 comprises the casing 106, the battery cells 114 housed inside the casing 106, the control circuit board 118 (an example of circuit board) housed inside the casing 106, the engaging member 122 held by the casing 106 so as to be movable in the up-down direction, the compression spring 80 (an example of first biasing member) configured to bias the engaging member 122 upward, and the compression spring 82 (an example of second biasing member) spaced apart from the compression spring 80 in the left-right direction and configured to bias the engaging member 122 upward. At least a part of the control circuit board 118 is arranged between the compression spring 80 and the compression spring 82. The engaging member 122 comprises the engaging portion 122*b* protruding to the outside of the casing 106. The engaging portion 122*b* includes the right engaging surface 122*j* and the left engaging surface 122*l* (an example of engaging surface) that extend in the up-down direction and the left-right direction and are configured to engage with the electrical device 4. In the front-rear direction, the right engaging surface 122*j* and the left engaging surface 122*l* are arranged rearward of a front end of the compression spring 80 and forward of a rear end of the compression spring 82. In the front-rear direction, the right engaging surface 122*j* and the left engaging surface 122*l* are arranged rearward of a front end of the compression spring 82 and forward of a rear end of the compression spring 82.

According to the configuration above, the compression spring 80 and the compression spring 82, which are spaced apart from each other in the left-right direction, bias the engaging member 122 upward, and thus the biasing force applied to the engaging member 122 can be balanced in the left-right direction and the engaging member 122 is suppressed from tilting with respect to the casing 106 in the left-right direction. Further, according to the configuration above, a position in the front-rear direction of the point of application of the biasing force applied to the engaging member 122 can be set close to a position of the engaging portion 122*b* in the front-rear direction. Thus, even when dust enters a gap between the engaging member 122 and the casing 106 and the engaging portion 122*b* is caught on the casing 106, the biasing force of the compression spring 80 and the compression spring 82 can be applied to the engaging member 122 to release the engaging member 76 from being caught. Further, according to the configuration above, at least a part of the control circuit board 118 is arranged between the compression spring 80 and the compression spring 82, and thus a space between the compression spring 80 and the compression spring 82 can be efficiently utilized.

In one or more embodiments, in the left-right direction, a right end of the compression spring 80 is arranged rightward of a right end of the right engaging surface 122*j*. In the left-right direction, a left end of the compression spring 82 is arranged leftward of a left end of the left engaging surface 122*l*.

According to the configuration above, a wide interval is ensured between the compression spring 80 and the compression spring 82, and thus a wide space for mounting elements and wires on the control circuit board 118 can be ensured. Further, since the wide interval is ensured between the compression spring 80 and the compression spring 82, the biasing force applied to the engaging member 122 can be easily balanced in the left-right direction and the engaging member 122 can be efficiently suppressed from tilting with respect to the casing 106 in the left-right direction.

In one or more embodiments, in the left-right direction, a left end of the compression spring 80 is arranged rightward of the right end of the right engaging surface 122*j*. In the left-right direction, a right end of the compression spring 82 is arranged leftward of the left end of the left engaging surface 122*l*.

According to the configuration above, a wide interval is ensured between the compression spring 80 and the compression spring 82, and thus a wide space for mounting elements and wires on the control circuit board 118 can be ensured. Further, since the wide interval is ensured between the compression spring 80 and the compression spring 82, the biasing force applied to the engaging member 122 can be easily balanced in the left-right direction and the engaging member 122 can be efficiently suppressed from tilting with respect to the casing 106 in the left-right direction.

In one or more embodiments, the battery pack-mount part 6 comprises the device-side terminal 8. The control circuit board 118 comprises the battery-side terminals 36 configured to mechanically engage with and electrically connect to the device-side terminal 8. In the left-right direction, a right end of the compression spring 80 is arranged rightward of a right end of the battery-side terminals 36. In the left-right direction, a left end of the compression spring 82 is arranged leftward of a left end of the battery-side terminals 36.

According to the configuration above, a wide interval is ensured between the compression spring 80 and the compression spring 82, and thus a wide space for mounting elements and wires on the control circuit board 118 can be ensured. Further, since the wide interval is ensured between the compression spring 80 and the compression spring 82, the biasing force applied to the engaging member 122 can be easily balanced in the left-right direction and the engaging member 122 can be efficiently suppressed from tilting with respect to the casing 106 in the left-right direction.

In one or more embodiments, in the left-right direction, a left end of the compression spring 80 is arranged rightward of the right end of the battery-side terminals 36. In the left-right direction, a right end of the compression spring 82 is arranged leftward of the left end of the battery-side terminals 36.

According to the configuration above, a wide interval is ensured between the compression spring 80 and the compression spring 82, and thus a wide space for mounting elements and wires on the control circuit board 118 can be ensured. Further, since the wide interval is ensured between the compression spring 80 and the compression spring 82, the biasing force applied to the engaging member 122 can be easily balanced in the left-right direction and the engaging member 122 can be efficiently suppressed from tilting with respect to the casing 106 in the left-right direction.

In one or more embodiments, the control circuit board 118 comprises the microcontroller 50 configured to control an operation of the battery pack 102. The microcontroller 50 is arranged between the compression spring 80 and the compression spring 82.

According to the configuration above, the microcontroller 50 is arranged on the control circuit board 118 between the compression spring 80 and the compression spring 82, and thus the other portions of the control circuit board 118 can be efficiently utilized as spaces for mounting other elements and wires.

In one or more embodiments, the casing 106 further comprises the right guide portion 132 and the left guide portion 134 (an example of guide portion) configured to prohibit movement of the engaging member 122 in the front-rear direction and to permit movement of the engaging member 122 in the up-down direction. In the front-rear direction, the compression spring 80 is arranged rearward of front ends of the right guide portion 132 and the left guide portion 134 and forward of rear ends of the right guide portion 132 and the left guide portion 134. In the front-rear direction, the compression spring 82 is arranged rearward of the front ends of the right guide portion 132 and the left guide portion 134 and forward of the rear ends of the right guide portion 132 and the left guide portion 134.

According to the configuration above, a position in the front-rear direction of the point of application of the biasing force applied from the compression spring 80 and the compression spring 82 to the engaging member 122 can be set close to a position of the right guide portion 132 and the left guide portion 134 in the front-rear direction. This can suppress the engaging member 122 from tilting in the front-rear direction.

In one or more embodiments, the battery pack 102 is configured to be detachably attached to the battery pack-mount part 6 of the electrical device 4 by being slid with respect to the battery pack-mount part 6. The front direction is defined as a direction in which the battery pack 102 is slid when the battery pack 102 is detached from the battery pack-mount part 6, the rear direction is defined as a direction in which the battery pack 102 is slid when the battery pack 102 is attached to the battery pack-mount part 6, the up direction is defined as a direction in which the battery pack-mount part 6 is positioned as viewed from the battery pack 102 in the state where the battery pack 102 is attached to the battery pack-mount part 6, and the down direction is defined as the direction opposite to the up direction. The battery pack 102 comprises the casing 106, the battery cells 114 housed inside the casing 106, the engaging member 122 held by the casing 106 so as to be movable in an up-down direction, the compression spring 80 (an example of first biasing member) configured to bias the engaging member 122 upward, and the compression spring 82 (an example of second biasing member) spaced apart from the compression spring 80 in the left-right direction and configured to bias the engaging member 122 upward. The engaging member 122 comprises the engaging portion **122*b* protruding to the outside of the casing 106. The engaging portion 122*b* includes the right engaging surface 122*j* and the left engaging surface 122*l* (an example of engaging surface) that extend in the up-down direction and the left-right direction and are configured to engage with the electrical device 4. In the front-rear direction, the right engaging surface 122*j* and the left engaging surface 122*l* are arranged rearward of a front end of the compression spring 80 and forward of a rear end of the compression spring 82. In the front-rear direction, the right engaging surface 122*j* and the left engaging surface 122*l* are arranged rearward of a front end of the compression spring 82 and forward of a rear end of the compression spring 82. In the left-right direction, a right end of the compression spring 80 is arranged rightward of a right end of the right engaging surface 122*j*. In the left-right direction, a left end of the compression spring 82 is arranged leftward of a left end of the left engaging surface 122*l***.

According to the configuration above, the compression spring 80 and the compression spring 82, which are spaced apart from each other in the left-right direction, bias the engaging member 122 upward, and thus the biasing force applied to the engaging member 122 can be balanced in the left-right direction and the engaging member 122 is suppressed from tilting with respect to the casing 106 in the left-right direction. Further, according to the configuration above, a position in the front-rear direction of the point of application of the biasing force applied to the engaging member 122 can be set close to a position of the engaging portion **122*b* in the front-rear direction. Thus, even when dust enters a gap between the engaging member 122 and the casing 106 and the engaging portion 122*b* is caught on the casing 106, the biasing force of the compression spring 80 and the compression spring 82 can be applied to the engaging member 122 to release the engaging member 76 from being caught. Further, according to the configuration above, a wide interval is ensured between the compression spring 80 and the compression spring 82, and thus the biasing force applied to the engaging member 122 can be easily balanced in the left-right direction and the engaging member 122 can be efficiently suppressed from tilting with respect to the casing 106** in the left-right direction.

In one or more embodiments, the battery pack 102 is configured to be detachably attached to the battery pack-mount part 6 of the electrical device 4 including the device-side terminal 8 by being slid with respect to the battery pack-mount part 6. The front direction is defined as a direction in which the battery pack 102 is slid when the battery pack 102 is detached from the battery pack-mount part 6, the rear direction is defined as a direction in which the battery pack 102 is slid when the battery pack 102 is attached to the battery pack-mount part 6, the up direction is defined as a direction in which the battery pack-mount part 6 is positioned as viewed from the battery pack 102 in the state where the battery pack 102 is attached to the battery pack-mount part 6, and the down direction is defined as the direction opposite to the up direction. The battery pack 102 comprises the casing 106, the battery cells 114 housed inside the casing 106, the battery-side terminals 36 configured to mechanically engage with and electrically connect to the device-side terminal 8, the engaging member 122 held by the casing 106 so as to be movable in the up-down direction, the compression spring 80 (an example of first biasing member) configured to bias the engaging member 122 upward, and the compression spring 82 (an example of second biasing member) spaced apart from the compression spring 80 in a left-right direction and configured to bias the engaging member 122 upward. The engaging member 122 comprises the engaging portion 122*b* protruding to the outside of the casing 106. The engaging portion 122*b* includes the right engaging surface 122*j* and the left engaging surface 122*l* (an example of engaging surface) that extend in the up-down direction and the left-right direction and are configured to engage with the electrical device 4. In the front-rear direction, the right engaging surface 122*j* and the left engaging surface 122*l* are arranged rearward of a front end of the compression spring 80 and forward of a rear end of the compression spring 82. In the front-rear direction, the right engaging surface 122*j* and the left engaging surface 122*l* are arranged rearward of a front end of the compression spring 82 and forward of a rear end of the compression spring 82. A right end of the compression spring 80 is arranged rightward of a right end of the battery-side terminals 36. In the left-right direction, a left end of the compression spring 82 is arranged leftward of a left end of the battery-side terminals 36.

According to the configuration above, the compression spring 80 and the compression spring 82, which are spaced apart from each other in the left-right direction, bias the engaging member 122 upward, and thus the biasing force applied to the engaging member 122 can be balanced in the left-right direction and the engaging member 122 is suppressed from tilting with respect to the casing 106 in the left-right direction. Further, according to the configuration above, a position in the front-rear direction of the point of application of the biasing force applied to the engaging member 122 can be set close to a position of the engaging portion 122*b* in the front-rear direction. Thus, even when dust enters a gap between the engaging member 122 and the casing 106 and the engaging portion 122*b* is caught on the casing 106, the biasing force of the compression spring 80 and the compression spring 82 can be applied to the engaging member 122 to release the engaging member 76 from being caught. Further, according to the configuration above, a wide interval is ensured between the compression spring 80 and the compression spring 82, and thus the biasing force applied to the engaging member 122 can be easily balanced in the left-right direction and the engaging member 122 can be efficiently suppressed from tilting with respect to the casing 106 in the left-right direction.

Variants

Although examples in which the spring supporting portions 84, 86, 124, 126 are formed on the cell holders 30, 116, and the compression springs 80, 82 bias the engaging members 76, 122 upward with respect to the cell holders 30, 116 have been described in the embodiments 35 above, the spring supporting portions 84, 86, 124, 126 may be formed on the upper casings 26, 112 or the lower casings 24, 110, and the compression springs 80, 82 may bias the engaging members 76, 122 upward with respect to the upper casings 26, 112 or the lower casings 24, 110.

Although an example in which the first biasing member is the compression spring 80 has been described in the embodiments above, the first biasing member may be another type of spring such as a tension spring or a twisted spring, an elastic member other than the spring, or a biasing member other than the elastic member. Similarly, although an example in which the second biasing member is the compression spring 82 has been described in the embodiments above, the second biasing member may be another type of spring such as a tension spring or a twisted spring, an elastic member of another type other than the spring, or a biasing member of another type other than the elastic member.

Although examples in which the circuit board is the control circuit boards 32, 118 comprising the battery-side terminals 36 have been described in the embodiments above, the circuit board may not comprise the battery-side terminals 36. Alternatively, the circuit board may be a terminal circuit board that does not comprise the microcontroller 50 and comprises the battery-side terminals 36. Alternatively, the circuit board may not comprise the battery-side terminals 36 nor the microcontroller 50. For example, the circuit board may be a manipulatable circuit board comprising a switch for accepting a user's input manipulation or a display circuit board comprising a display lamp for display to the user.

Although examples in which the battery cells 28, 114 are lithium-ion battery cells have been described in the embodiments above, the battery cells 28, 114 may be secondary battery cells of another type. Although examples in which the battery cells 28, 114 have a substantially columnar shape have been described in the embodiments above, the battery cells 28, 114 may have another shape. The number of the battery cells 28, 114 included in the battery packs 2, 102 may be different from the numbers mentioned in the embodiments above.

The invention claimed is:

1. A battery pack configured to be detachably attached to a battery pack-mount part of an electrical device by being slid with respect to the battery pack-mount part, wherein a front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction, the battery pack comprising:

a casing;

a battery cell housed inside the casing;

a circuit board housed inside the casing;

an engaging member held by the casing so as to be movable in an up-down direction;

a first biasing member configured to bias the engaging member upward; and a second biasing member spaced apart from the first biasing member in a left-right direction and configured to bias the engaging member upward, wherein at least a part of the circuit board is arranged between the first biasing member and the second biasing member, the engaging member includes an engaging portion protruding to outside of the casing, the engaging portion has an engaging surface that extends in the up-down direction and the left-right direction and is configured to engage with the electrical device, in a front-rear direction, the engaging surface is arranged rearward of a front end of the first biasing member and forward of a rear end of the first biasing member, and in the front-rear direction, the engaging surface is arranged rearward of a front end of the second biasing member and forward of a rear end of the second biasing member.

2. The battery pack according to claim 1, wherein in the left-right direction, a right end of the first biasing member is arranged rightward of a right end of the engaging surface, and in the left-right direction, a left end of the second biasing member is arranged leftward of a left end of the engaging surface.

3. The battery pack according to claim 2, wherein in the left-right direction, a left end of the first biasing member is arranged rightward of the right end of the engaging surface, and in the left-right direction, a right end of the second biasing member is arranged leftward of the left end of the engaging surface.

4. The battery pack according to claim 1, wherein the battery pack-mount part includes a device-side terminal, the circuit board includes a battery-side terminal configured to mechanically engage with and electrically connect to the device-side terminal, in the left-right direction, a right end of the first biasing member is arranged rightward of a right end of the battery-side terminal, and in the left-right direction, a left end of the second biasing member is arranged leftward of a left end of the battery-side terminal.

5. The battery pack according to 4, wherein in the left-right direction, a left end of the first biasing member is arranged rightward of the right end of the battery-side terminal, and in the left-right direction, a right end of the second biasing member is arranged leftward of the left end of the battery-side terminal.

6. The battery pack according to claim 1, wherein the circuit board includes a power path along which a current discharged to and/or charged from the electrical device flows, and the power path passes between the first biasing member and the second biasing member.

7. The battery pack according to claim 1, wherein the circuit board includes a microcontroller configured to control an operation of the battery pack, and the microcontroller is arranged between the first biasing member and the second biasing member.

8. The battery pack according to claim 1, further comprising a manipulatable member pivotably held by the casing and having a manipulatable surface configured to be manipulated by a user, wherein when the user presses the manipulatable surface, the manipulatable member pivots in a direction that causes the engaging member to be pushed downward.

9. The battery pack according to claim 8, wherein the manipulatable surface is arranged on a front upper surface of the casing.

10. The battery pack according to claim 9, wherein the manipulatable member is held by the casing so as to be pivotable about a pivot axis extending in the left-right direction.

11. The battery pack according to claim 8, wherein the engaging member includes a portion to be abutted, the manipulatable member includes an abutment portion arranged above the portion to be abutted, in the front-rear direction, a position where the abutment portion abuts the portion to be abutted is rearward of the front end of the first biasing member and forward of the rear end of the first biasing member, and in the front-rear direction, the position where the abutment portion abuts the portion to be abutted is rearward of the front end of the second biasing member and forward of the rear end of the second biasing member.

12. The battery pack according to claim 11, wherein the portion to be abutted includes a rod-shaped portion extending in the left-right direction, and the abutment portion includes an abutment piece arranged above the rod-shaped portion.

13. The battery pack according to claim 1, wherein the casing further includes a guide portion configured to prohibit movement of the engaging member in the front-rear direction and to permit movement of the engaging member in the up-down direction, in the front-rear direction, the first biasing member is arranged rearward of a front end of the guide portion and forward of a rear end of the guide portion, and in the front-rear direction, the second biasing member is arranged rearward of the front end of the guide portion and forward of the rear end of the guide portion.

14. A battery pack configured to be detachably attached to a battery pack-mount part of an electrical device by being slid with respect to the battery pack-mount part, wherein a front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in a state where the battery pack is attached to the battery pack-mount part, and a down direction is defined as a direction opposite to the up direction, the battery pack comprising:

a casing;

a battery cell housed inside the casing;

an engaging member held by the casing so as to be movable in an up-down direction;

a first biasing member configured to bias the engaging member upward; and a second biasing member spaced apart from the first biasing member in a left-right direction and configured to bias the engaging member upward, wherein the engaging member includes an engaging portion protruding to outside of the casing, the engaging portion has an engaging surface that extends in the up-down direction and the left-right direction and is configured to engage with the electrical device, in a front-rear direction, the engaging surface is arranged rearward of a front end of the first biasing member and forward of a rear end of the first biasing member, in the front-rear direction, the engaging surface is arranged rearward of a front end of the second biasing member and forward of a rear end of the second biasing member, in the left-right direction, a right end of the first biasing member is arranged rightward of a right end of the engaging surface, and in the left-right direction, a left end of the second biasing member is arranged leftward of a left end of the engaging surface.

15. A battery pack configured to be detachably attached to a battery pack-mount part of an electrical device including a device-side terminal by being slid with respect to the battery pack-mount part, wherein a front direction is defined as a direction in which the battery pack is slid when the battery pack is detached from the battery pack-mount part, a rear direction is defined as a direction in which the battery pack is slid when the battery pack is attached to the battery pack-mount part, an up direction is defined as a direction in which the battery pack-mount part is positioned as viewed from the battery pack in state where the battery pack is attached to the battery pack-mount part, and a down direction is defined as a direction opposite to the up direction, the battery pack comprising:

a casing;

a battery cell housed inside the casing;

a battery-side terminal configured to mechanically engage with and electrically connect to the device-side terminal;

an engaging member held by the casing so as to be movable in an up-down direction;

a first biasing member configured to bias the engaging member upward; and a second biasing member spaced apart from the first biasing member in a left-right direction and configured to bias the engaging member upward, wherein the engaging member includes an engaging portion protruding to outside of the casing, the engaging portion has an engaging surface that extends in the up-down direction and the left-right direction and is configured to engage with the electrical device, in a front-rear direction, the engaging surface is arranged rearward of a front end of the first biasing member and forward of a rear end of the first biasing member, in the front-rear direction, the engaging surface is arranged rearward of a front end of the second biasing member and forward of a rear end of the second biasing member, in the left-right direction, a right end of the first biasing member is arranged rightward of a right end of the battery-side terminal, and in the left-right direction, a left end of the second biasing member is arranged leftward of a left end of the battery-side terminal.

16. The battery pack according to claim 1, further comprising:

a manipulatable member having a manipulatable surface exposed to outside of the casing, wherein the engaging portion is configured to move toward inside of the casing when the manipulatable surface is pressed, an anti-slip portion that is formed of regularly arranged convex shapes and/or concave shapes is formed on the manipulatable surface, and the anti-slip portion is arranged, on the manipulatable surface, on a side closer to the engaging portion.

17. The battery pack according to claim 16, wherein the anti-slip portion is formed of a plurality of convex lines and/or concave lines extending in a direction substantially orthogonal to the direction in which the battery pack is slid when the battery pack is detached from the battery pack-mount part.

18. The battery pack according to claim 3, wherein the battery pack-mount part includes a device-side terminal, the circuit board includes a battery-side terminal configured to mechanically engage with and electrically connect to the device-side terminal, in the left-right direction, a right end of the first biasing member is arranged rightward of a right end of the battery-side terminal, in the left-right direction, a left end of the second biasing member is arranged leftward of a left end of the battery-side terminal, in the left-right direction, a left end of the first biasing member is arranged rightward of the right end of the battery-side terminal, in the left-right direction, a right end of the second biasing member is arranged leftward of the left end of the battery-side terminal, the circuit board includes a power path along which a current discharged to and/or charged from the electrical device flows, the power path passes between the first biasing member and the second biasing member, the circuit board includes a microcontroller configured to control an operation of the battery pack, the microcontroller is arranged between the first biasing member and the second biasing member, the battery pack further comprises a manipulatable member pivotably held by the casing and having a manipulatable surface configured to be manipulated by a user, when the user presses the manipulatable surface, the manipulatable member pivots in a direction that causes the engaging member to be pushed downward, the manipulatable surface is arranged on a front upper surface of the casing, the manipulatable member is held by the casing so as to be pivotable about a pivot axis extending in the left-right direction, the engaging member includes a portion to be abutted, the manipulatable member includes an abutment portion arranged above the portion to be abutted, in the front-rear direction, a position where the abutment portion abuts the portion to be abutted is rearward of the front end of the first biasing member and forward of the rear end of the first biasing member, in the front-rear direction, the position where the abutment portion abuts the portion to be abutted is rearward of the front end of the second biasing member and forward of the rear end of the second biasing member, the portion to be abutted includes a rod-shaped portion extending in the left-right direction, the abutment portion includes an abutment piece arranged above the rod-shaped portion, the casing further includes a guide portion configured to prohibit movement of the engaging member in the front-rear direction and to permit movement of the engaging member in the up-down direction, in the front-rear direction, the first biasing member is arranged rearward of a front end of the guide portion and forward of a rear end of the guide portion, in the front-rear direction, the second biasing member is arranged rearward of the front end of the guide portion and forward of the rear end of the guide portion, the manipulatable surface is exposed to outside of the casing, an anti-slip portion that is formed of regularly arranged convex shapes and/or concave shapes is formed on the manipulatable surface, the anti-slip portion is arranged, on the manipulatable surface, on a side closer to the engaging portion, and the anti-slip portion is formed of a plurality of convex lines and/or concave lines extending in a direction substantially orthogonal to the direction in which the battery pack is slid when the battery pack is detached from the battery pack-mount part.

* * * * *